United States Patent
Milroy

(10) Patent No.: US 10,760,691 B2
(45) Date of Patent: Sep. 1, 2020

(54) AIR VALVE SEAT AND LAND

(71) Applicant: Mueller International, LLC, Atlanta, GA (US)

(72) Inventor: Jeff Milroy, Glen Ellyn, IL (US)

(73) Assignee: Mueller International, LLC, Atlanta, GA (US)

(*) Notice: Subject to any disclaimer, the term of this patent is extended or adjusted under 35 U.S.C. 154(b) by 0 days.

(21) Appl. No.: 16/107,421

(22) Filed: Aug. 21, 2018

(65) Prior Publication Data

US 2018/0372230 A1  Dec. 27, 2018

Related U.S. Application Data

(62) Division of application No. 14/851,664, filed on Sep. 11, 2015, now Pat. No. 10,100,935.

(51) Int. Cl.
| | |
|---|---|
| *F16K 1/36* | (2006.01) |
| *F16K 1/42* | (2006.01) |
| *F16K 31/22* | (2006.01) |
| *F16K 31/26* | (2006.01) |
| *F16K 24/04* | (2006.01) |

(52) U.S. Cl.
CPC ............... *F16K 1/36* (2013.01); *F16K 1/427* (2013.01); *F16K 24/044* (2013.01); *F16K 24/048* (2013.01); *F16K 31/22* (2013.01); *F16K 31/26* (2013.01)

(58) Field of Classification Search
USPC ............... 137/202; 251/262, 359–365
See application file for complete search history.

(56) References Cited

U.S. PATENT DOCUMENTS

| | | | | |
|---|---|---|---|---|
| 3,152,604 | A | * 10/1964 | Frye | F16K 24/042 |
| | | | | 137/202 |
| 3,197,174 | A | 7/1965 | Killian | |
| 3,620,653 | A | 11/1971 | Gaylord et al. | |
| 4,243,066 | A | 1/1981 | Lambie | |
| 4,687,019 | A | * 8/1987 | Mayfield | E21B 21/10 |
| | | | | 137/375 |
| 6,105,610 | A | * 8/2000 | Watkins, II | F16K 15/04 |
| | | | | 137/516.29 |
| 10,100,935 | B2 | 10/2018 | Milroy | |
| 2017/0074414 | A1 | 3/2017 | Milroy | |

OTHER PUBLICATIONS

Milroy, Jeff; Applicant-Initiated Interview Summary for U.S. Appl. No. 14/851,664, filed Sep. 11, 2015, dated Apr. 5, 2018, 3 pgs.
Milroy, Jeff; Final Office Action for U.S. Appl. No. 14/851,664, filed Sep. 11, 2015, dated Mar. 2, 2018, 16 pgs.
(Continued)

*Primary Examiner* — Daphne M Barry
(74) *Attorney, Agent, or Firm* — Taylor English Duma LLP

(57) ABSTRACT

An air valve includes a valve body having an inner surface and an outer surface, the inner surface and the outer surface defining an inlet and an outlet; a sealing device mounted within the valve body, the sealing device including a first contacting portion and a second contacting portion; and a float moveable within the valve body, the float having a first sealing position and a second sealing position.

21 Claims, 14 Drawing Sheets

(56) References Cited

OTHER PUBLICATIONS

Milroy, Jeff; Non-Final Office Action for U.S. Appl. No. 14/851,664, filed Sep. 11, 2015, dated Oct. 6, 2017; 18 pgs.
Milroy, Jeff; Notice of Allowance for U.S. Appl. No. 14/851,664, filed Sep. 11, 2015, dated May 18, 2018, 11 pgs.
Milroy, Jeff; Restriction Requirement for U.S. Appl. No. 14/851,664, filed Sep. 11, 2015, dated Jul. 7, 2017; 7 pgs.
Milroy, Jeff; U.S. Patent Application entitled: Air Valve Seat and Land having U.S. Appl. No. 14/851,664, filed Nov. 11, 2015, 54 pgs.
CLA-VAL; Specification Sheet for "High Performance Combination Air Release & Vacuum Valve", copyright 2010, 2 pgs.
Henry Pratt Company; Catalog for AirPro Max Air Valves, copyright 2014, 40 pgs.
Milroy, Jeff; Issue Notification for U.S. Appl. No. 14/851,664, filed Sep. 11, 2015, dated Sep. 26, 2018, 1 pg.

\* cited by examiner

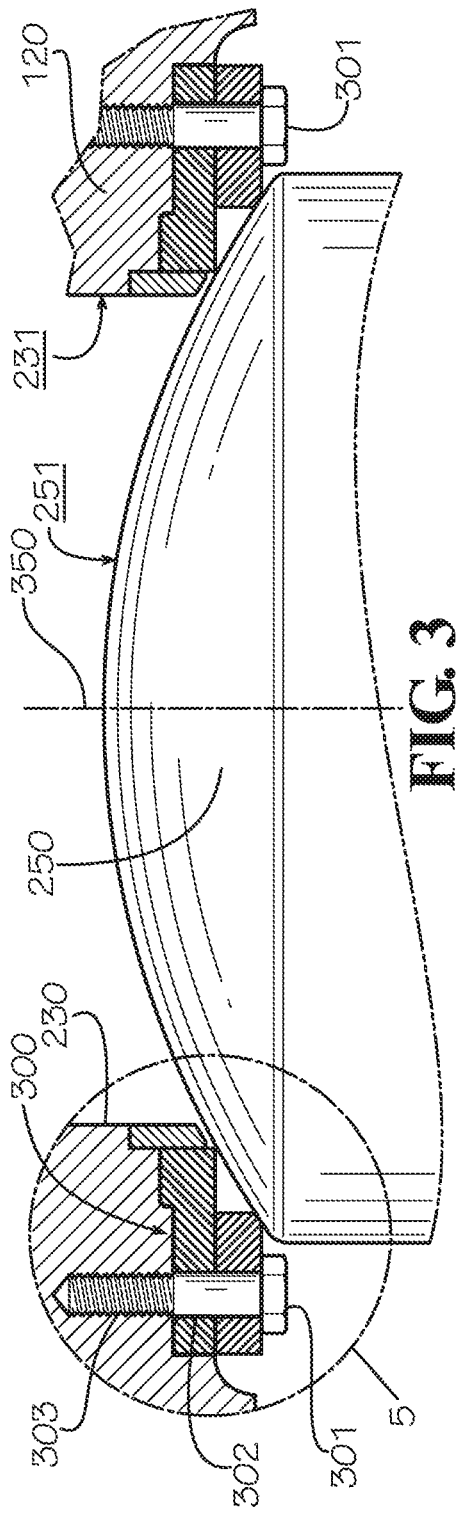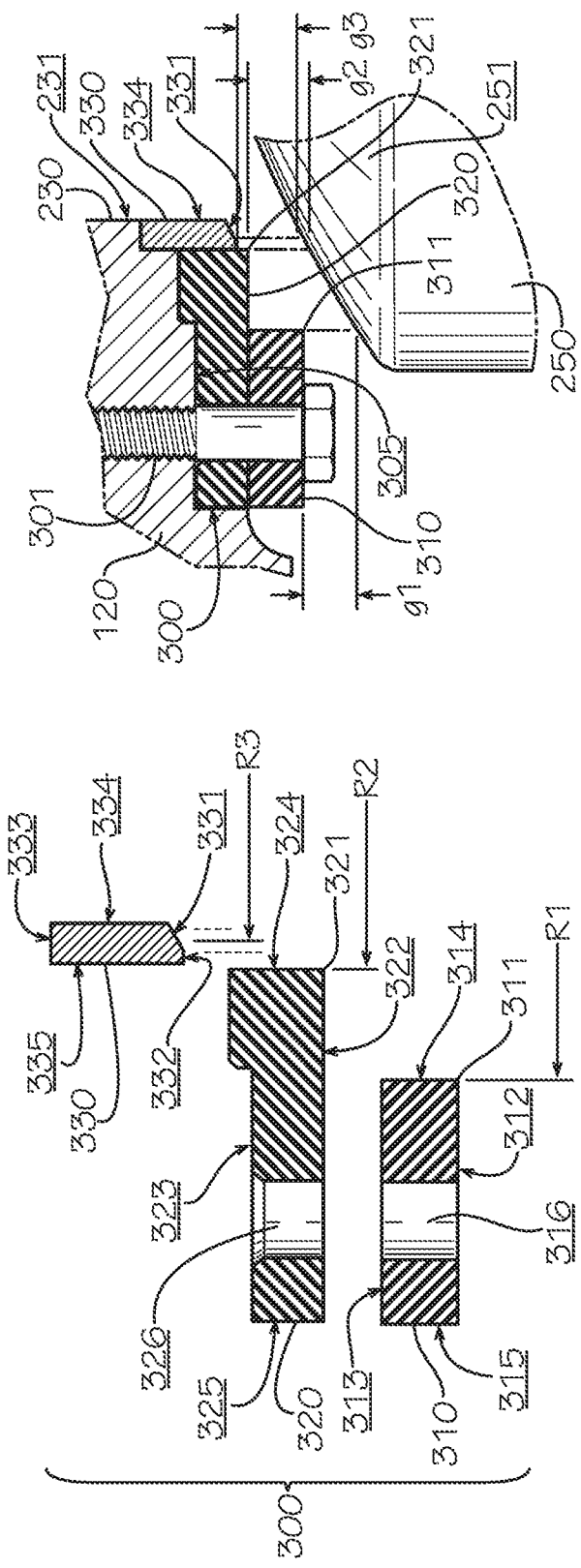

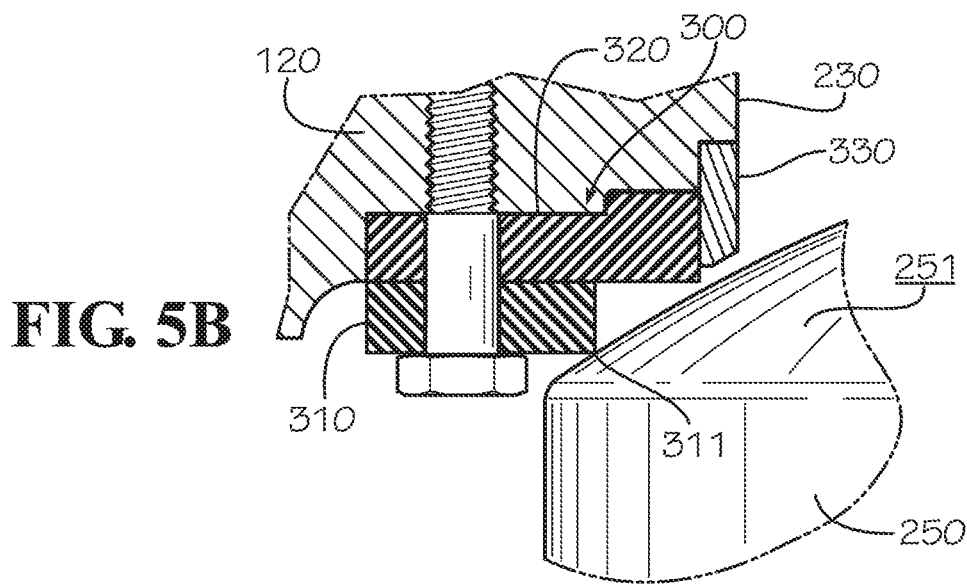
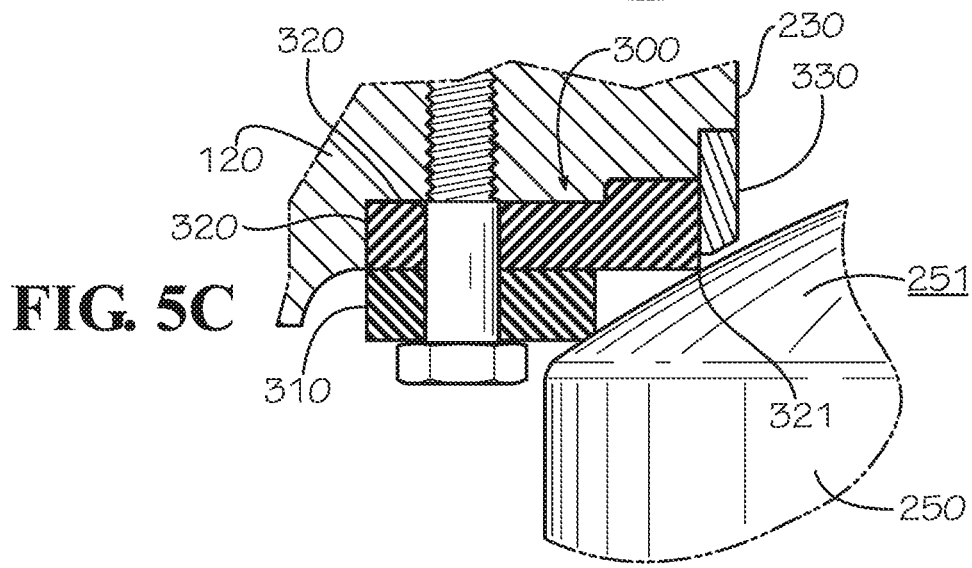
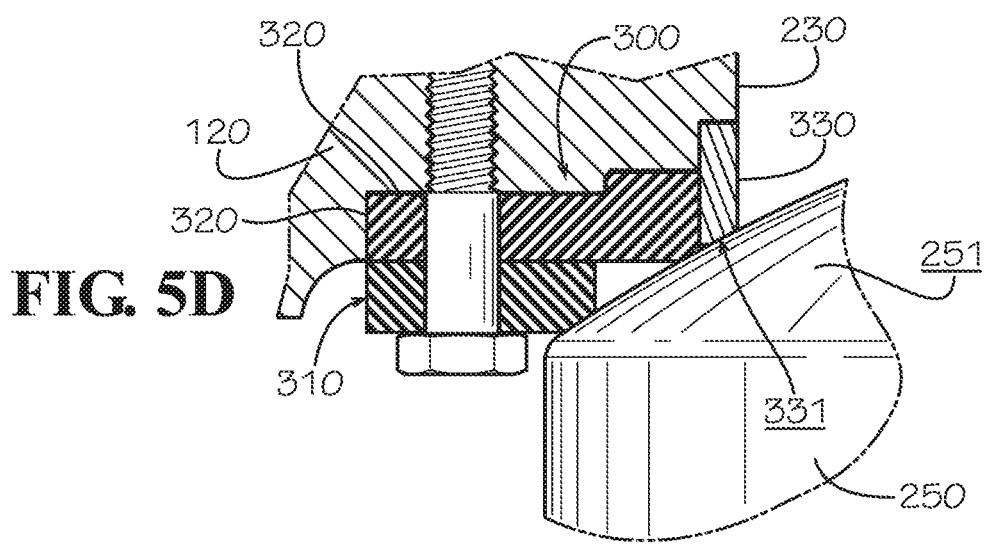

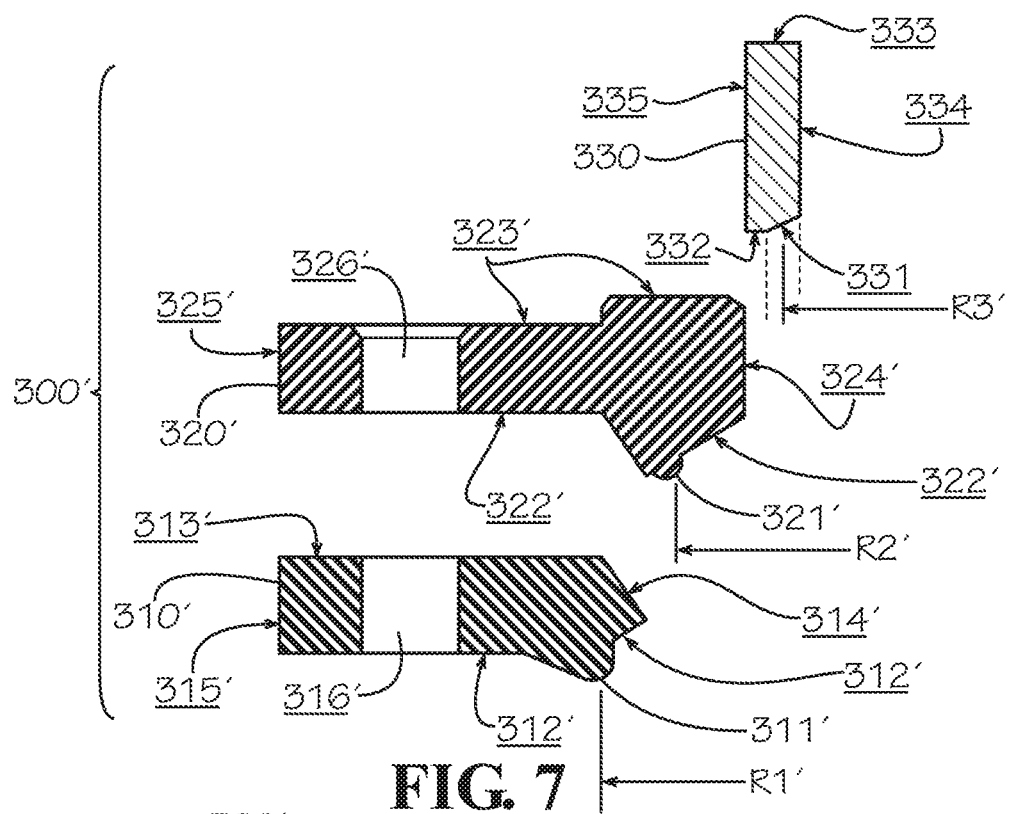
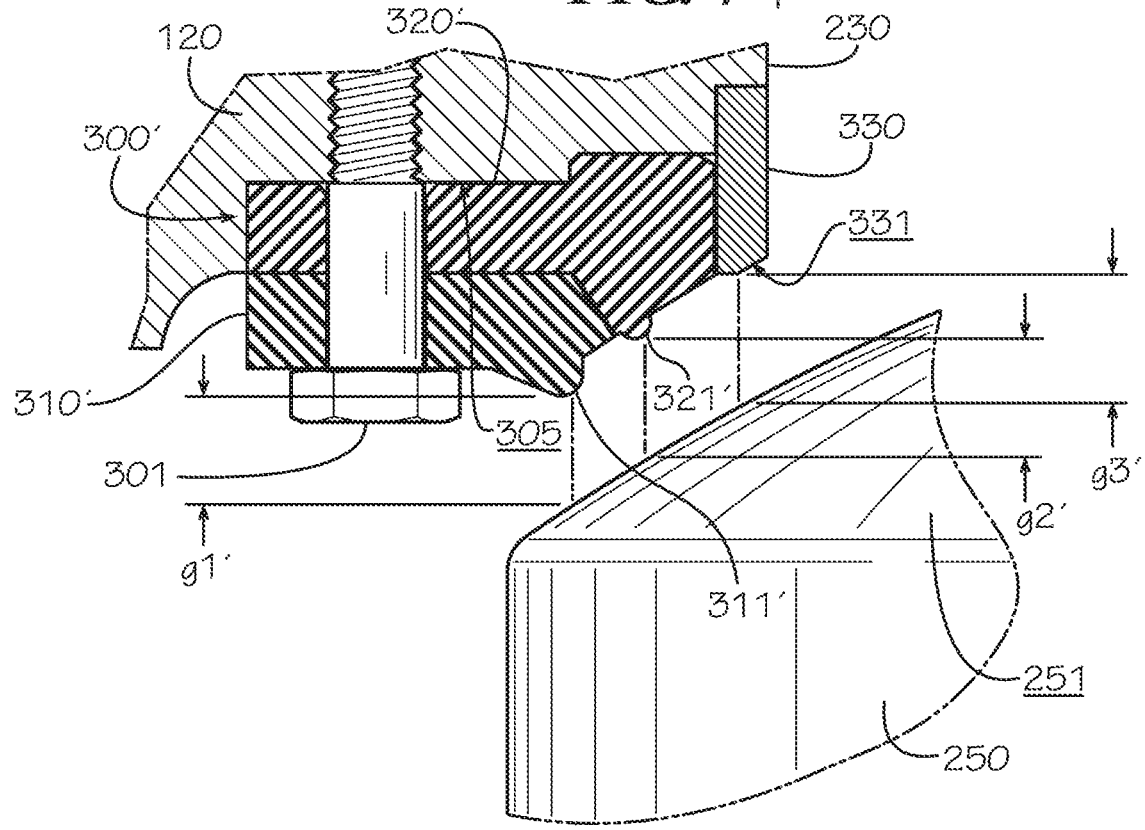
FIG. 7
FIG. 8A

AIR VALVE SEAT AND LAND

CROSS-REFERENCE TO RELATED APPLICATIONS

This application is a divisional of U.S. patent application Ser. No. 14/851,664, filed on Sep. 11, 2015, and entitled "Air Valve Seat and Land," which is hereby specifically incorporated by reference herein in its entirety.

TECHNICAL FIELD

This disclosure relates to valves. More specifically, this disclosure relates to air valves in a fluid system.

BACKGROUND

It is occasionally desirable to remove air from the interior of a fluid system to the exterior of the fluid system through an air valve. In many cases, it is also desirable that air from the exterior of the fluid system be prevented from entering the fluid system through the same air valve when air is not being removed from the interior of the fluid system through the air valve. When air is being removed from the fluid system, the air valve is open, and when air is not being removed from the fluid system, the air valve is closed. Over time, seals in the air valve may deteriorate in quality and effectiveness after repetitive operation of the air valve or under a wide range of fluid and fluid system conditions. Violent closure of the air valve is also possible under certain conditions, which can also cause damage to an air valve seal. In addition, a seal that is suitable for only one small range of pressures or one type of fluid system has limited use. Even though the fluid type and certain factors may be known, the fluid pressure, the frequency of air valve operation, and other variables may vary or may be unknown for a particular fluid system.

SUMMARY

Disclosed is an air valve including: a valve body having an inner surface and an outer surface, the inner surface and the outer surface defining an inlet and an outlet; a sealing device mounted within the valve body, the sealing device including a first contacting portion and a second contacting portion; and a float moveable within the valve body, the float having a first sealing position and a second sealing position.

Also disclosed is a method for venting air from a fluid system, the method including: installing an air valve apparatus, the air valve apparatus including a valve body defining an inlet and an outlet, a sealing device mounted inside the valve body, and a float moveable within the valve body; moving the float to a first sealing position engaging the first contacting portion but not the second contacting portion; and moving the float to a second sealing position engaging the first contacting portion and the second contacting portion.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3 is a sectional detail view of a float, sealing device, and cover of the air valve of FIG. 1 with the air valve in the closed position, taken from detail 3 of FIG. 2B.

FIG. 4 is a sectional exploded view of the sealing device of the air valve of FIG. 1.

FIG. 5A is a sectional detail view of the float, sealing device, and cover of the air valve of FIG. 1 with the air valve in a slightly open position, arranged in the view of detail 5 of FIG. 3.

FIG. 5B is a sectional detail view of the float, sealing device, and cover of the air valve of FIG. 1 with the float in initial contact with a first contacting portion of the sealing device, arranged in the view of detail 5 of FIG. 3.

FIG. 5C is a sectional detail view of the float, sealing device, and cover of the air valve of FIG. 1 with the float in initial contact with a second contacting portion of the sealing device, taken from detail 5 of FIG. 3.

FIG. 5D is a sectional detail view of the float, sealing device, and cover of the air valve of FIG. 1 with the float in initial contact with a third contacting portion of the sealing device, arranged in the view of detail 5 of FIG. 3.

FIG. 7 is a sectional exploded view of the sealing device of FIG. 6.

FIG. 8A is a sectional detail view of the float, sealing device, and cover of FIG. 6 with the air valve in a slightly open position, arranged in the view of detail 8 of FIG. 6.

DETAILED DESCRIPTION

Disclosed is an air valve and associated methods, systems, devices, and various apparatus. The air valve includes a valve body, a sealing device mounted within the valve body and having one or more contacting portions, and a float or a disc (sometimes spelled "disk") moveable within the valve body and engageable with the one or more contacting portions. It would be understood by one of skill in the art that the disclosed air valve is described in but a few exemplary embodiments among many. No particular terminology or description should be considered limiting on the disclosure or the scope of any claims issuing therefrom.

Figure 1:
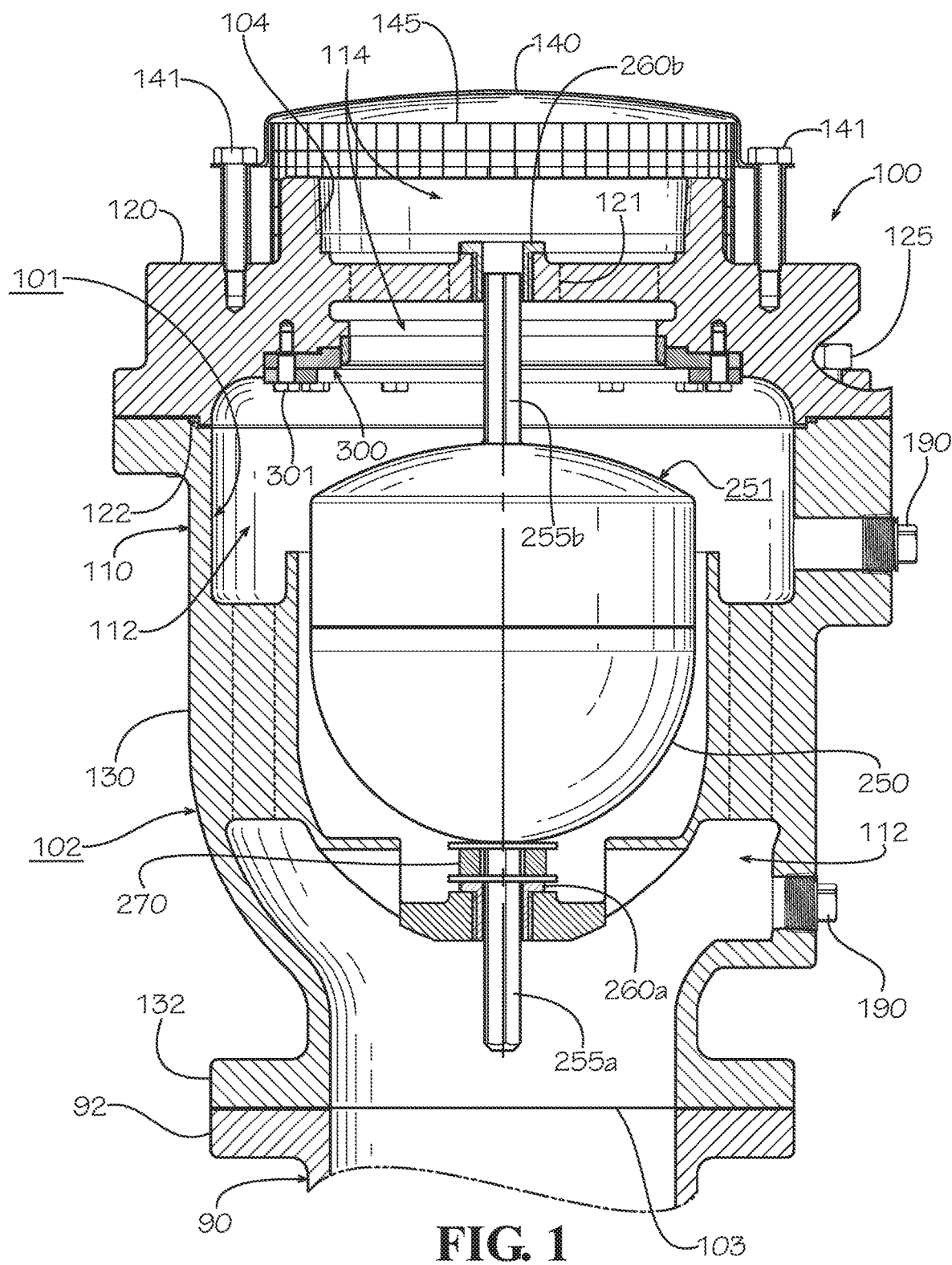
FIG. 1 is a sectional view of an air valve in accordance with one embodiment of the current disclosure.
Figure 2A:
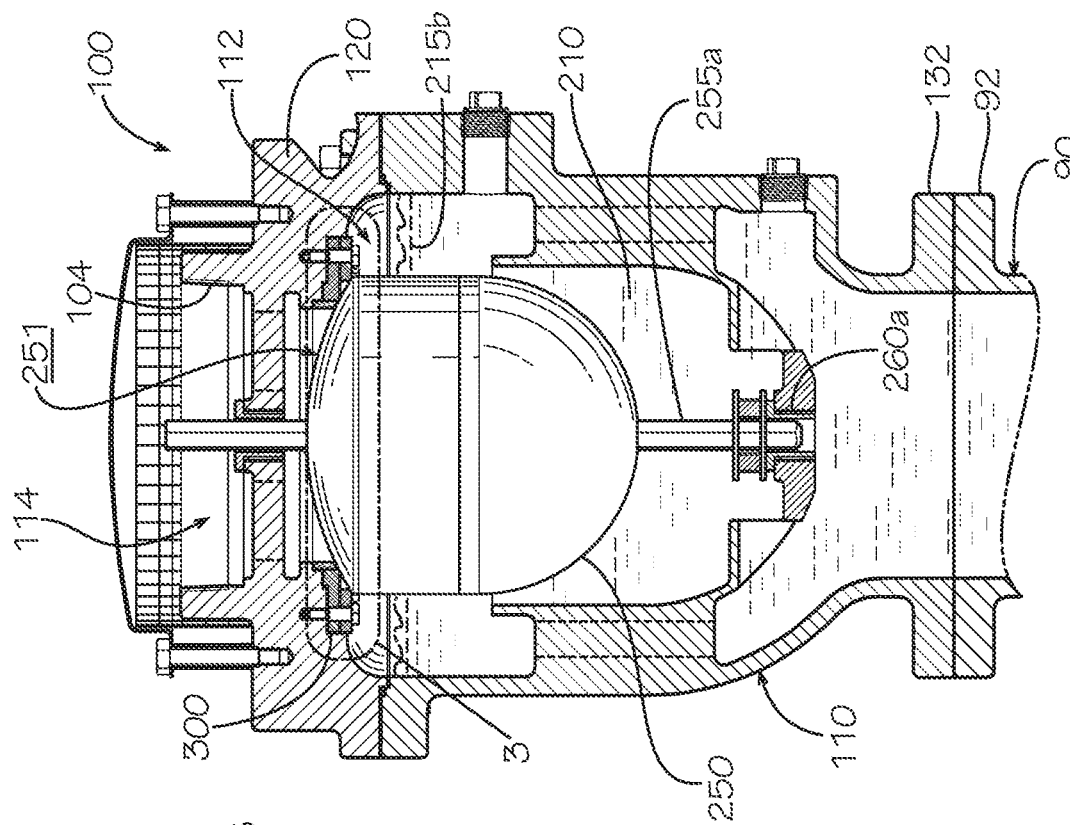
FIG. 2A is a sectional view of the air valve of FIG. 1 with a float of the air valve rising towards a closed position.
Figure 2B:
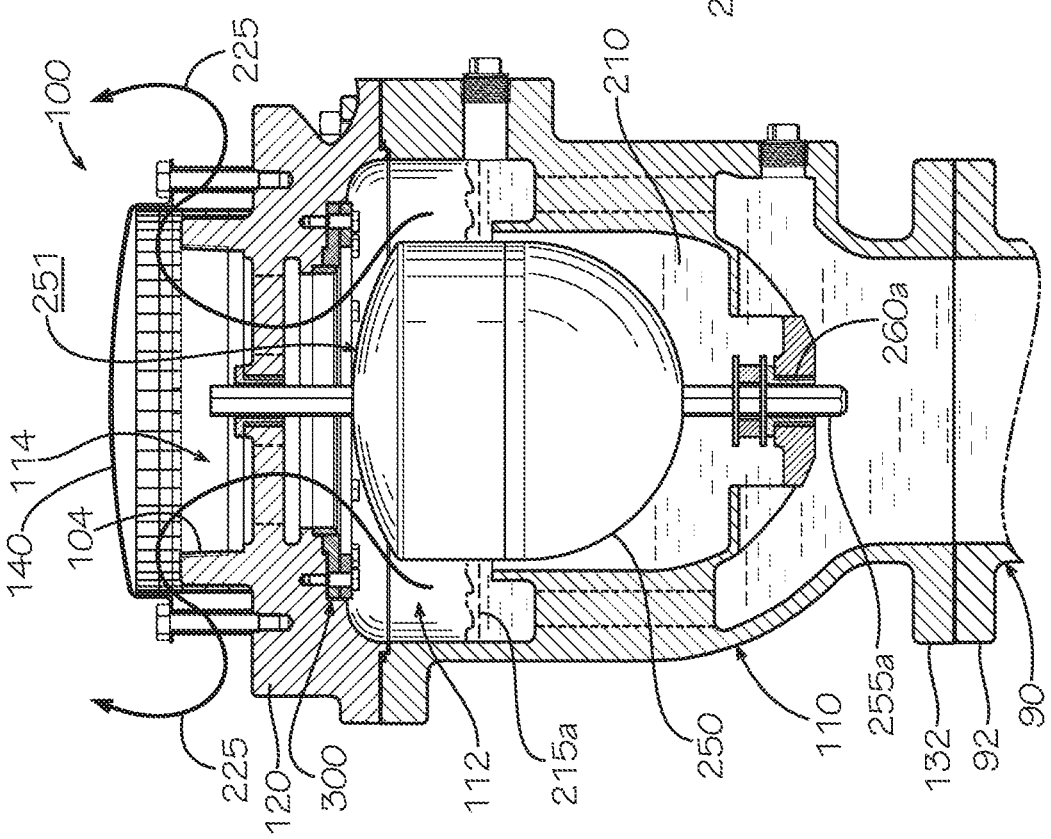
FIG. 2B is a sectional view of the air valve of FIG. 1 in the closed position.

FIG. 1 discloses one embodiment of an air valve 100 attached to a fluid system 90 containing a fluid 210 (shown in FIGS. 2A and 2B). In the current embodiment, the air valve 100 is an air vacuum valve, though other air valves 100 would be understood by one of skill in the art to be included as various embodiments of the current disclosure. The disclosure of an air vacuum valve should not be considered limiting as the disclosed structures and methods may be extended to a variety of other valves and water control devices including, but not limited to, air valves generally, air release valves, combination valves that combine the functions of both an air vacuum valve and an air release valve, check valves, anti-shock valves, ball valves, plug valves, cone valves, butterfly valves, and air inlet valves such as vacuum breaker valves. In various embodiments, the air valve 100 may be installed at high points and change of gradients inside a fluid system 90 or at regular intervals of, for example, approximately every one-quarter mile to one-half mile along sections of the fluid system 90 without clearly defined high points. However, the disclosure of such installation locations for the air valve 100 should not be considered limiting on the current disclosure, and the air valve 100 may be installed at any location in the fluid system 90 in various embodiments, including regular or irregular intervals. In the current embodiment, the air valve 100 is mounted on a high point of the fluid system 90 to allow air to travel upward by scouring and/or buoyancy in the fluid system 90 to the air valve 100, although the air valve 100 may be mounted at any point of the fluid system 90 where air may accumulate or where necessity mandates.

The type of fluid 210 used in the fluid system 90 should not be considered limiting on the current disclosure, and may include drinking water or other drinkable liquids, wastewater, rainwater, seawater, or other water-based liquids, industrial fluids and chemicals, or fuel, and may include particulates or other solids or gases suspended or mixed with the fluid 210.

The air valve 100 includes a valve body 110 with a mounting portion 132 that attaches to a mounting portion 92 of the fluid system 90. In the current embodiment, mounting portions 92,132 are mating flanges. The valve body 110 of the air valve 100 has an inner surface 101 and an outer surface 102 defining an inlet 103 and an outlet 104. The mounting portion 132 and the mounting portion 92 may connect to one another using any one or more of a number of different methods including, but not limited to, threads such as pipe threads, welding, or adhesive, or may be formed integrally as one part. The valve body 110 includes an enclosure 130 and a cover 120 and may also include one or more plugs 190. In various embodiments, at least one of the valve body 110 and the cover 120 are made from ductile iron and are coated on the inner surface 101 and the outer surface 102 with a two-part liquid epoxy or fusion bond epoxy coating. The disclosure of a ductile iron material and epoxy coating, however, should not be considered limiting on the current disclosure.

The assembled air valve 100 may also include a seal 122 between the enclosure 130 and the cover 120. In various embodiments, the seal 122 is an O-ring. The seal 122 may also be a gasket. The cover 120 is assembled to the enclosure 130 with a plurality of fasteners 125 in the form of a plurality of nuts and bolts in the current embodiment. In various embodiments, fasteners 125 are hex head bolts made from AISI Type 316 stainless steel. Where a fastener such as fastener 125 is disclosed herein, the disclosure of a particular type of fastener such as the fastener 125 with the described specifications, however, should not be considered limiting on the current disclosure. Other fasteners or fastening methods such as nails, screws, threads, threaded studs, clamps, weldments or welding, or any other type of fastener may be used in various embodiments. Additional components may be added to the valve body 110 or air valve 100, and the components in combination described above are not all required.

Figure 11:
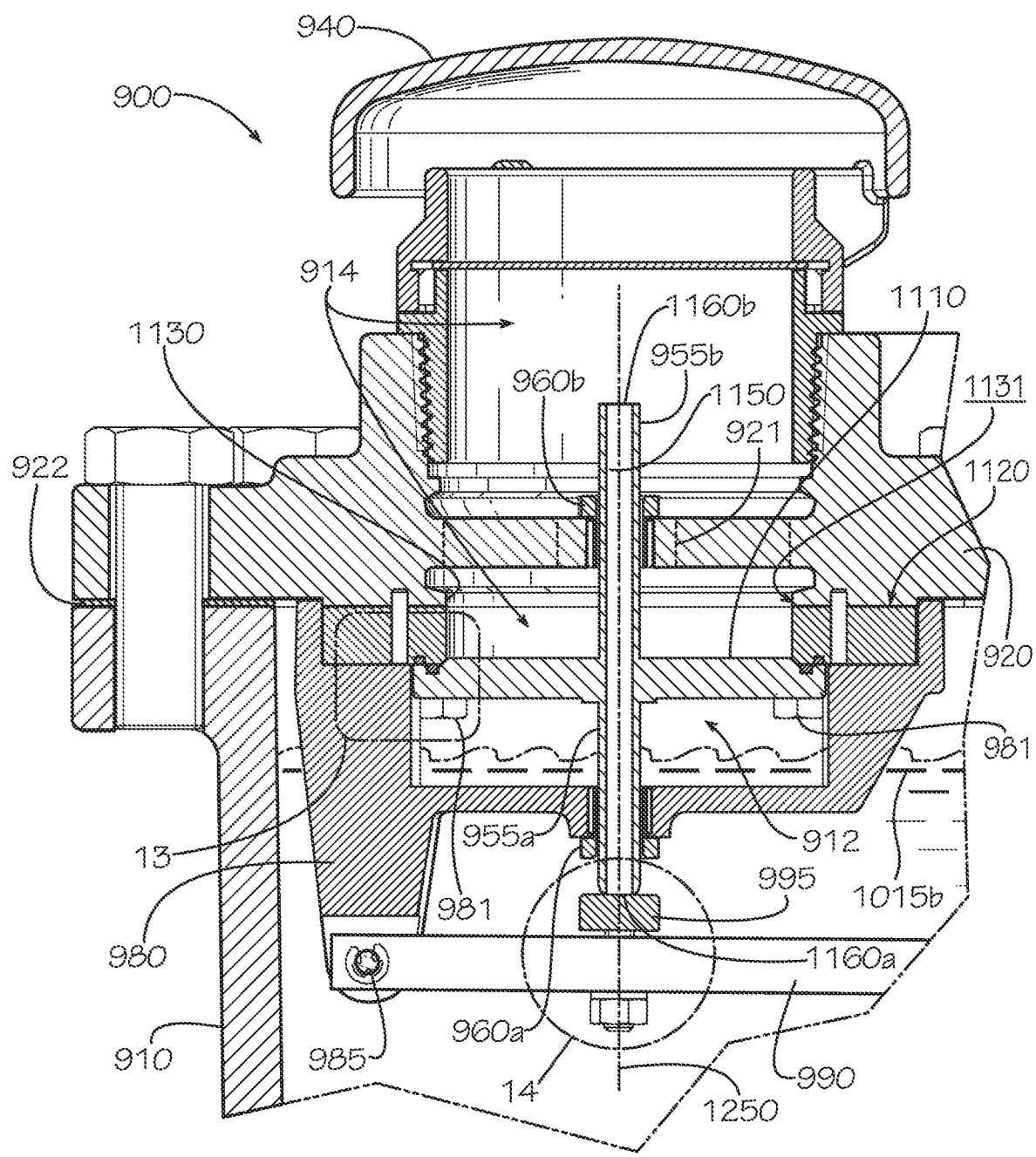
FIG. 11 is sectional detail view of the air valve of FIG. 9 with the air valve in the closed position, taken from detail 11 of FIG. 10B.

In various embodiments, the air valve 100 includes a float 250 and a sealing device 300. In various embodiments, the sealing device 300 is assembled to the cover 120 with a plurality of fasteners 301. In various embodiments, the sealing device 300 is assembled to the cover 120 with a single clamp (not shown) including a screw or equivalent fastener. When the float 250, moveable within the valve body 110, comes into contact with the sealing device 300 to close the air valve 100, the air valve 100 effectively defines an inner chamber 112 and an outer chamber 114 that are separated from each other. When the air valve 100 is open, fluid and air in the inner chamber 112 is able to enter the outer chamber 114 and vice versa. In various embodiments, the outer chamber 114 includes one or more cover outlets 121 defined in the cover 120 which provide passage for air from one portion of the outer chamber 114 to other portions of the outer chamber 114. In various embodiments, the one or more cover outlets 121 are openings defined in a spoke and hub arrangement in the cover 120. In various embodiments, the air valve 100 includes a hood device which itself includes a hood 140, a screen 145, and a plurality of fasteners 141, which in the current embodiment secure the hood device to the cover 120. Instead of the hood device being assembled to the cover 120 as shown in FIG. 1, the hood device may be assembled to another portion of the air valve 100 in various other embodiments or may be assembled to the air valve 100 using a threaded connection (similarly as shown in FIG. 11, although the structure shown in FIG. 11 should not be considered limiting on the current disclosure).

The float 250 may include one or more guide shafts 255 to limit and direct the movement of the float 250 in a particular path. In various embodiments, a lower guide shaft 255a slides along an axial center of a lower bushing 260a and an upper guide shaft 255b slides along an axial center of an upper bushing 260b. The air valve 100 may also include a bumper 270 to cushion the float 250 when the float 250 nears or reaches its lowest vertical position. The float 250 has an upper surface 251 that is convex in the current embodiment but in various embodiments may have any one or more of a number of different shapes including, but not limited to, conical, spherical, flat, or concave. While the float 250 in the current embodiment is capsule-shaped with a truncated, convex upper surface, the shape of the float 250 or the location of the float 250 within the valve body 110 should not be considered limiting on the current disclosure. In various embodiments, the float 250 may be ball-shaped or spherical, truncated, disc-shaped, cylindrical, or have any other shape. The float 250 in the current embodiment is formed from a rigid material but in various embodiments may be solid or hollow and may be formed from or filled with a flexible material, and if hollow may be pressurized with air or another fluid.

In various embodiments, the float 250 becoming buoyant (i.e., float) in the fluid 210 of the fluid system 90 effectuates the purpose of the float 250 responding to and effectively controlling the operation of the air valve 100. In the current embodiment, the float 250 is made of stainless steel and is formed of two halves welded together to form a hollow interior that allows the float 250 to float in a fluid 110. In various embodiments, the float 250 and other internal parts or "trim" are made of AISI Type 316 stainless steel. The disclosure of stainless steel for the float 250 should not be considered limiting on the current disclosure, however, as the float 250 may be made of other materials including, but not limited to, plastic or rubber. In various embodiments, at least a portion of the upper surface 251 of the float 250 is polished to a mirror finish in order to reduce irregularities at the upper surface 251 where the float contacts the sealing device 300 in order to reduce the pressure at which the float 250 seals against the sealing device 300 or otherwise improve sealing. It is possible with the use of an unpolished float, especially in the case of a float formed from plastic, for that float to have a rough surface that traps imperfections and can suffer from overheating or melting as a result or accumulates a buildup of sediment or other solids, for example in a wastewater system. In various other embodiments, a polished float 250 may not be needed or desired. In various embodiments, the float 250 itself is sealed in such a way that the float 250 is impermeable to fluid. In various embodiments, a float such as the float 250 may contain a weight or a plurality of weights such as shot (including lead shot) or sand to adjust the buoyancy of the float.

In various embodiments, a plurality of floats (not shown) may be used inside a single air valve. In various embodiments using two or more floats, including when the fluid system 90 is a wastewater system, it may be desirable to prevent buildup of waste or solids on an upper float to prevent interference between the upper float and the sealing device or seat or to prevent corrosion of the upper float. In such a double-float embodiment, the lower float may be directly lifted by a rising fluid level (and soiled in the process) while the upper float, which has remained clean, seats properly and firmly against the sealing device and closes the air valve thereby.

FIGS. 2A and 2B disclose the air valve 100 with the float 250 in two different positions. FIG. 2A discloses the air valve 100 with the float 250, buoyed by fluid 210 of fluid system 90, rising towards a closed position of the air valve 100. As a fluid level 215a rises, the float 250 also rises. As a result, the upper surface 251 of the float 250 approaches the sealing device 300. In various embodiments, as long as the outlet 104 is uncovered and the fluid pressure within the fluid system 90 is greater than atmospheric pressure outside the fluid system 90, this movement of the float 250 results from fluid pressure within the fluid system 90 forcing air out of the valve body 110 through the outlet 104. The air escaping the air valve 100 travels from the inner chamber 112 through the outer chamber 114 before exiting the air valve 100 via airflow paths 225. When the fluid 210 is at or above a fluid level 215b, as shown in FIG. 2B, the float 250 covers and engages the sealing device 300, thereby covering and sealing the outlet 104. When the float 250 covers the outlet 104, the fluid and the air cease to leave the valve body 110 because the float 250 has a diameter larger than a diameter of the circular profile of the bore 230. As long as the pressure inside the air valve 100 is at zero gage pressure or below, this venting process is repeated as more air enters the fluid system 90 and accumulates in the air valve 100 to move the fluid 210 below fluid level 215b, moving the float 250 away from the sealing device 300. In valves other than air vacuum valves such as the air valve 100, the venting process is repeated as more air enters the fluid system 90 even if the pressure is above zero gage pressure.

A draining process (not shown), allows air to enter the fluid system 90 to prevent a vacuum condition including when there is a power failure or a breach somewhere in the pipeline of the fluid system 90 or for any other reason, planned or unplanned. When the fluid 210 in the fluid system 90 lowers to a fluid level that effectively empties the fluid from the air valve 100, the float 250 moves away from the sealing device 300. In such a condition, the fluid pressure is lowered within the fluid system 90 so that air from outside the fluid system 90 is drawn into the outlet 104, through the air valve 100, to the inlet 103 to enter the fluid system 90. During the draining process, as the fluid 210 in the air valve 100 moves below the fluid level 215b shown in FIG. 2B and then below the fluid level 215a shown in FIG. 2A, the guide shafts 255a,b move downward within the guide bushings 260a,b, respectively, until the float 250 contacts the bumper 270. Thus further downward movement of the float 250 is prevented. Therefore the float 250 is positioned away from the sealing device 300 and the outlet 104 but cannot continue to move downward to block the inlet 103. In various embodiments, the float 250 is constrained to move in only a single, vertical direction by the vertical movement of the guide shafts 255a,b, inside the bushings 260a,b, respectively, of the valve body 110.

FIG. 2B discloses the air valve 100 in the closed position with the upper surface 251 of the float 250 in contact with and sealing against the sealing device 300 as the result of the fluid 210 at the fluid level 215b, higher than the fluid level 215a, buoying the float 250 at a higher position. In the closed position of the air valve 100, a small amount of air is allowed to remain in the inner chamber 112, but the remaining air originally in the inner chamber 112 has entered the outer chamber 114 of the air valve 100 or exited the air valve 100 entirely. In the closed position of the air valve 100, the lower guide shaft 255a is shown at least partially remaining inside the lower bushing 260a.

FIG. 3 discloses the float 250, the sealing device 300, and the cover 120 of the air valve 100 with the air valve 100 in the closed position. The float 250 is shown in FIG. 3 in a second sealing position, which is discussed in further detail below. The sealing device 300 is shown assembled to the cover 120 with the fasteners 301. In various embodiments, the fasteners 301 include a shoulder portion 302 and a threaded portion 303. A washer (not shown) may additionally be used with fastener 301 to increase the surface area across which the fastener contacts the sealing device 300 or to prevent direct contact between a head of the fastener 301 and the sealing device 300. In various embodiments, the cover 120 defines a bore 230 further defining a bore surface 231.

FIG. 4 shows an exploded view of the sealing device 300 of the air valve 100. In various embodiments, the first contacting portion 310, the second contacting portion 320, and the third contacting portion 330 are formed as three separate and distinct parts. A first contacting portion 310 of the sealing device 300 includes a contact edge 311, a lower surface 312, an upper surface 313, an inside surface 314, an outside surface 315, and a bore surface 316. In various embodiments, each of the lower surface 312, the upper surface 313, the inside surface 314, and the outside surface 315 are flat in cross-section. However, the disclosure of each surface being flat in cross-section should not be considered limiting on the current disclosure. In various embodiments, any one or more of the lower surface 312, the upper surface 313, the inside surface 314, and the outside surface 315 are stepped, curved or otherwise of a shape that is not flat in cross-section.

In various embodiments, one or both of the first contacting portion 310 and the second contacting portion 320 are formed from one or more of a group of materials in the nitrile butadiene rubber (NBR) family of synthetic rubber materials. In various embodiments, the first contacting portion 310 and the second contacting portion 320 are formed from a nitrile rubber, which can also be described as Buna-N rubber and acrylonitrile butadiene rubber (ABR). The disclosure of a Buna-N rubber or other NBR rubber, however, should not be considered limiting on the current disclosure, as the first contacting portion 310 or the second contacting portion 320 can be made from any one or more of a number of other materials including, but not limited to, natural rubber, ethylene propylene diene monomer (EPDM), styrene-butadiene rubber (SBR), an acetal such as DELRIN resin, fibre-reinforced or fiberglass-reinforced plastic (FRP), a polyamide such as NYLON resin, a synthetic rubber such as VITON elastomer, a polytetrafluoroethylene (PTFE) such as TEFLON, and silicone rubber. In various other embodiments, the first contacting portion 310 or the second contacting portion 320 is formed from a material other than rubber. In various embodiments, the first contacting portion 310 or the second contacting portion 320 includes an embedded core made from a metallic or other rigid material surrounded partially or completely by an elastic material such as one or more of the materials disclosed herein. In various embodiments, the first contacting portion 310 or the second contacting portion 320 is made from a material that is resistant to attack by the chlorine or chloramines used in some water supplies. In various embodiments, the first contacting portion 310 or the second contacting portion 320 is made from a peroxide-cured EPDM or similar material with increased resistance to chlorine or chloramines.

In various embodiments, a material hardness of a first material forming the first contacting portion 310 measures within a range between 10 on the Shore A scale and 90 on the Shore A scale. In various embodiments, a material hardness of a first material forming the first contacting portion 310 measures within a range between about 20 on the Shore A scale and 90 on the Shore A scale. In various embodiments, a material hardness of a first material forming the first contacting portion 310 measures within a range between about 10 on the Shore A scale and about 40 on the Shore A scale. In various embodiments, a material hardness of a first material forming the first contacting portion 310 is less than or equal to about 20 on the Shore A scale. The disclosure of a material hardness of the first contacting portion 310 being less than or equal to about 20 on the Shore A scale, however, should not be considered limiting on the current disclosure.

A second contacting portion 320 of the sealing device 300 includes a contact edge 321, a lower surface 322, an upper surface 323, an inside surface 324, an outside surface 325, and a bore surface 326. In various embodiments, each of the lower surface 322, the upper surface 323, the inside surface 324, and the outside surface 325 are flat in cross-section. In the current embodiment, the upper surface 323 is disclosed as having a stepped shape in cross-section, the upper surface 323 made up of multiple flat portions, some of which are non-coplanar. However, the disclosure of each surface being either flat or stepped in cross-section should not be considered limiting on the current disclosure. In various embodiments, any one or more of the lower surface 322, the upper surface 323, the inside surface 324, and the outside surface 325 are stepped, curved or otherwise of a shape that is not flat in cross-section. In various embodiments, a material hardness of the second contacting portion 320 is greater than a material hardness of the first contacting portion 310. In various embodiments, a material hardness of a second material forming the second contacting portion 320 measures within a range between 10 on the Shore A scale and 90 on the Shore A scale. In various embodiments, the material hardness of the second material forming the second contacting portion 320 measures within a range between about 20 on the Shore A scale and 90 on the Shore A scale. In various embodiments, the material hardness of the second material forming the second contacting portion 320 measures less than or equal to about 70 on the Shore A scale. In various embodiments, a material hardness of a material forming the second contacting portion 320 is less than or equal to about 85 on the Shore A scale. The disclosure of a material hardness of the second contacting portion 320 being less than or equal to about 70 or less than or equal to about 85 on the Shore A scale, however, should not be considered limiting on the current disclosure. In addition, the disclosure herein of specific hardness ranges should also not be considered limiting on the current disclosure.

For purposes of the current disclosure, a material hardness measuring about X on the Shore A scale (or any other scale) measures within a range between X plus an industry-standard upper tolerance for the specified measurement and X minus an industry-standard lower tolerance for the specified measurement. Because tolerances can vary between different components and between different models of air valves and because disinfectant and other media exposure can affect a material hardness measurement, the tolerance for a particular measurement of a particular component of a particular air valve can fall within a range of tolerances. In various embodiments, a material hardness measuring about X on the Shore A scale measures within a range between X plus 5 and X minus 5 on the Shore A scale.

A third contacting portion 330 of the sealing device 300 includes a contact surface 331, which can also be described as a "land," a lower surface 332, an upper surface 333, an inside surface 334, and an outside surface 335. In various embodiments, each of the contact surface 331, the lower surface 332, the upper surface 333, the inside surface 334, and the outside surface 335 are flat in cross-section. However, the disclosure of each surface being flat in cross-section should not be considered limiting on the current disclosure. In various embodiments, any one or more of the contact surface 331, the lower surface 332, the upper surface 333, the inside surface 334, and the outside surface 335 are stepped, curved or otherwise of a shape that is not flat in cross-section. In various embodiments, the contact surface 331 is slightly curved to match the radius of the upper surface 251 of the float 250. In other words, the surface of the land or contact surface 331 that is contactable with the float 250 has a cross-sectional shape that is complementary to a cross-sectional shape of the upper surface 251 of the float 250. In various embodiments, a material hardness of a material forming the third contacting portion 330 is greater than about 85 on the Shore A scale. In various embodiments, the third contacting portion 330 is formed from a group of metals or metal alloys including, but not limited to, brass or stainless steel. In various embodiments, the third contacting portion 330 is formed from brass, a material that is softer than stainless steel, in order to not mark or mar the upper surface 251 of the float 250 during long-term operation of the air valve 100. The disclosure of a metallic material for the third contacting portion 330 should not be considered limiting on the current disclosure, however, as the third contacting portion 330 can be formed from any material having the desirable material hardness properties including other corrosion-resistant materials. The disclosure of a material hardness of the third contacting portion 330 being greater than about 85 on the Shore A scale, however, should not be considered limiting on the current disclosure. In various embodiments, the contact surface 331 of the third contacting portion 330 forms a drip-tight compression seal at higher pressures. In various embodiments, such a compression seal is formed even though both mating parts are metallic such as in a plumbing union.

In using the terms "greater than" or "less than" to compare the hardness of materials or to compare the hardness of a material to a hardness value on a particular hardness scale, it is assumed that the same Shore A hardness scale is used. While other hardness scales exist and may be appropriate to measure the hardness of one or more materials disclosed herein, it is not intended that a hardness measurement on another scale (Shore D scale, for example) be compared to a hardness measurement on the Shore A scale without an appropriate conversion factor or without using an appropriate conversion chart.

In various embodiments of the sealing device 300 including a first contacting portion 310 and a second contacting portion 320, a first lowermost portion (i.e. the contact edge 311) of the first contacting portion 310 is positioned a first radial distance R1 from a central axis 350 of the sealing device 300 and a second lowermost portion (i.e. the contact edge 321) of the second contacting portion 320 is positioned a second radial distance R2 from the central axis 350 of the sealing device 300, the first radial distance R1 greater than the second radial distance R2. In various embodiments of the sealing device 300 further including a third contacting portion 330, a first lowermost portion (i.e. the contact surface 331) of the third contacting portion 330 is positioned a third radial distance R3 from a central axis 350 of the sealing device 300, the third radial distance R3 being less than the second radial distance R2.

In various embodiments, the third radial distance R3 is measured to a point halfway between a radially inward edge of the contact surface 331 and a radially outward edge of the contact surface 331. In various embodiments, the contact surface 331 is effectively an edge because the distance between the radially inward edge of the contact surface 331 and the radially outward edge of the contact surface 331 is approximately zero. In various embodiments, one or both of the radially inward edge of the contact surface 331 and the radially outward edge of the contact surface 331 are radiused to create one or more smooth edges.

In various embodiments of the sealing device 300, the first contacting portion 310, the second contacting portion 320, and the third contacting portion 330 each resemble an annular ring. In various embodiments, therefore, the first contacting portion 310 can be described as being included on a first ring, the second contacting portion 320 can be described as being included on a second ring, and the third contacting portion 330 can be described as being included on a third ring.

FIG. 5A discloses the air valve 100 in a slightly open position with the float 250 in close proximity to the sealing device 300 and the sealing device 300 shown assembled to a mounting surface 305 of the cover 120 with the fastener 301. In various embodiments, the radially innermost surface 334 of the third contacting portion 330 is flush and co-annular with the bore surface 231 of the bore 230 of the cover 120. A vertical distance measured between the contact edge 311 of the first contacting portion 310 and the upper surface 251 of the float 250 is defined as a first gap g1, where the "vertical" distance is measured in a direction parallel to the travel of the float 250 inside the enclosure 130 of the air valve 100. A vertical distance measured between the contact edge 321 of the second contacting portion 320 and the upper surface 251 of the float 250 is defined as a second gap g2. A vertical distance measured between the contact surface 331 of the third contacting portion 330 and the upper surface 251 of the float 250 is defined as a third gap g3. In various embodiments, the first gap g1 measures less than the second gap g2, and the second gap g2 measures less than the third gap g3.

In various embodiments, improved sealing of an air valve is possible even when using a float and a sealing device shaped differently than the float 250 and the sealing device 300 of the air valve 100. In various embodiments, improved sealing similar to the sealing device 300 can result when a first vertical gap between a float and a first contacting portion is smaller than a second vertical gap between the float and a second contacting portion; a second vertical gap between the float and the second contacting portion is smaller than a third vertical gap between the float and a third contacting portion; a material hardness for the first contacting portion is less than a material hardness for the second contacting portion; and the material hardness for the second contacting portion is less than a material hardness for a third contacting portion.

FIGS. 5B through 5D show the interaction between the float 250 and the sealing device 300 of the air valve 100 as the pressure inside the fluid system 90 increases, causing the float 250 to increasingly compress the sealing device 300. FIGS. 5B through 5D disclose the float 250 in a first sealing position, a second sealing position, and a third sealing position, respectively. In FIG. 5B showing the float 250 engaging the sealing device 300 in the first sealing position, the upper surface 251 of the float 250 is in initial contact with the contact edge 311 of the first contacting portion 310 of the sealing device 300 but is not in contact with the second contacting portion 320 or the third contacting portion 330. In various embodiments, the contact edge 311 is the first point of contact on the first contacting portion with the upper surface 251 of the float 250.

FIG. 5C discloses the float 250 engaging the sealing device 300 in the second sealing position with the upper surface 251 of the float 250 still in contact with the first contacting portion 310 but also shown in initial contact with the contact edge 321 of the second contacting portion 320 of the sealing device 300. In various embodiments, the contact edge 321 is the first point of contact on the second contacting portion with the upper surface 251 of the float 250. In various embodiments, the material forming the first contacting portion 310 is elastically deformed but not plastically deformed as the float 250 approaches the second sealing position from the first sealing position. If the material of the first contacting portion 310 is elastically deformed and not plastically deformed, the first contacting portion 310 is able to return to the shape it held before the float 250 came into contact with the sealing device 300 (as shown in FIG. 5A) and thus avoid the "crush" form of seal damage that can result from the sealing material experiencing "compression set" or otherwise experiencing permanent or plastic deformation. In various embodiments, avoiding a "compression set" condition is accomplished by not loading the sealing device or portion thereof in such a way that it deflects more than 25% of its original height, though the disclosure of 25% deflection should not be considered limiting on the current disclosure. In the second sealing position, the float 250 is not yet in contact with the third contacting portion 330.

FIG. 5D discloses the float 250 engaging the sealing device 300 in the third sealing position, the upper surface 251 of the float 250 still in contact with the first contacting portion 310 and with the second contacting portion 320 but also shown in contact with the contact surface 331 of the third contacting portion 330 of the sealing device 300. In various embodiments, the contact surface 331 is the first point of contact on the third contacting portion with the upper surface 251 of the float 250. In various embodiments, the materials forming the first contacting portion 310 and the second contacting portion 320 are elastically deformed but not plastically deformed as the float 250 approaches the third sealing position from the second sealing position. If the material of the first contacting portion 310 and the second contacting portion 320 are elastically deformed and not plastically deformed, the first contacting portion 310 and the second contacting portion 320 are able to return to the shape each held before the float 250 came into contact with the sealing device 300 (as shown in FIG. 5A). In the third sealing position, further travel of the float 250 is avoided by using a relatively rigid material such as the aforementioned brass or stainless steel for the third contacting portion 330. Because further travel of the float 250 is avoided, the "crush" form of seal damage that can result from the sealing material experiencing "compression set" or otherwise experiencing permanent or plastic deformation is also avoided.

In practice, a user may rightly be concerned as to whether a sealing device for an air valve is suitable for the relatively low, medium, or high pressures being experienced at the time an evaluation is made and installation is performed and also suitable to pressures that the air valve may experience in the future during operation. Installing an air valve such as the air valve 100 with the sealing device 300, which in various embodiments uses increasingly harder materials to form the first contacting portion 310, the second contacting portion 320, and the third contacting portion 330, respectively, alleviates this concern by making it possible to use the air valve 100 in a fluid system 90 having varying characteristics—such as varying pressure or surge characteristics—or even in varying fluid systems 90. In various embodiments, the multiple contacting portions 310,320,330 and the other features described herein allow the air valve 100 to seal whether the pressures inside the fluid system 90 drop below, for example, 7-10 psig or are at the maximum capacity of the air valve or anywhere in between. In various embodiments, a sealing device described herein such as the sealing device 300 seals an air valve such as the air valve 100 from 0 psig to the pressure limit of the air valve 100 without weeping or dripping at low pressure and without being crushed or otherwise damaged at high pressure, wherein weeping or dripping is effectively a slow continuous leak past a seal such as the sealing device 300. In various embodiments, the use of a sealing device described herein such as the sealing device 300 further permits the reduction of parts inventory. Multiple parts for each type and size valve are not required in various embodiments because a single sealing device such as the sealing device 300 covers the entire range of possible conditions and characteristics of the fluid system 90.

Figure 6:
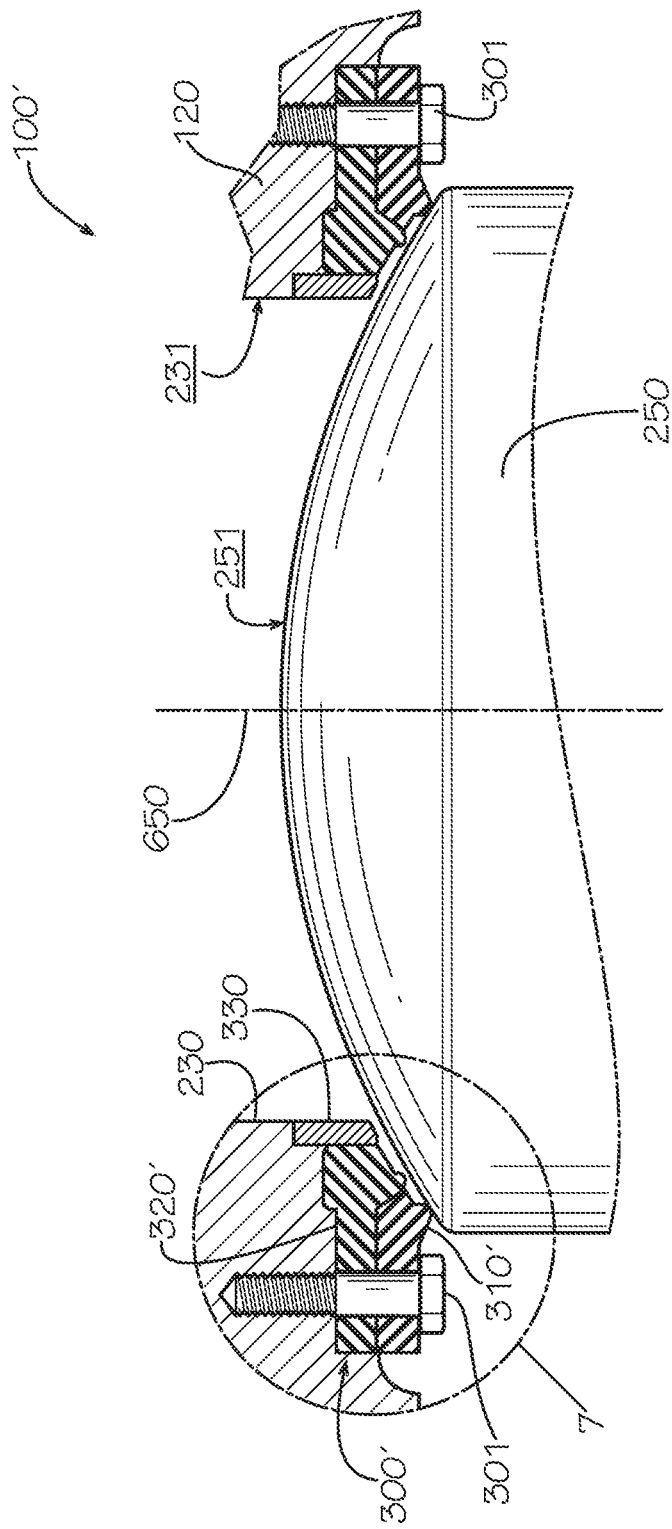
FIG. 6 is a sectional view of another embodiment of the float, sealing device, and cover of the air valve of FIG. 1 with the air valve in the closed position, arranged in the view of detail 3 of FIG. 2B.

FIG. 6 discloses another embodiment of an air valve, specifically an air valve 100' including the float 250, a sealing device 300', and the cover 120 of the air valve 100' with the air valve 100' in the closed position. The float 250 is shown in FIG. 3 in a first sealing position, which is discussed in further detail below. The sealing device 300' is shown assembled to the cover 120 with the fasteners 301 and includes a first contacting portion 310', a second contacting portion 320', and a third contacting portion 330'. A washer (not shown) may additionally be used with fastener 301 to increase the surface area across which the fastener contacts the sealing device 300' or to prevent direct contact between a head of the fastener 301 and the sealing device 300'.

FIG. 7 discloses shows an exploded view of the sealing device 300'. A first contacting portion 310' of the sealing device 300' includes a contact edge 311', a lower surface 312', an upper surface 313', an inside surface 314', an outside surface 315', and a bore surface 316'. In various embodiments, each of the lower surface 312', the upper surface 313', the inside surface 314', and the outside surface 315' are flat in cross-section. In the current embodiment, the lower surface 312' is disclosed as having multiple portions, some of which are non-coplanar in cross-section. For example, the lower surface 312' is made up of at least one flat portion and at least one curved or bulbous portion including the contact edge 311'. In various embodiments, any one or more of the lower surface 312', the upper surface 313', the inside surface 314', and the outside surface 315' are stepped, curved or otherwise of a shape that is not flat in cross-section.

In various embodiments, one or both of the first contacting portion 310' and the second contacting portion 320' are formed from one or more of a group of the same materials from which the first contacting portion 310 and the second contacting portion 320 are formed. In various embodiments, a material hardness of a first material forming the first contacting portion 310' measures within a range between 10 on the Shore A scale and 90 on the Shore A scale. In various embodiments, a material hardness of a first material forming the first contacting portion 310' measures within a range between about 20 on the Shore A scale and 90 on the Shore A scale. In various embodiments, a material hardness of a first material forming the first contacting portion 310' measures within a range between about 10 on the Shore A scale and about 40 on the Shore A scale. In various embodiments, a material hardness of a first material forming the first contacting portion 310' is less than or equal to about 20 on the Shore A scale. The disclosure of a material hardness of the first contacting portion 310' being less than or equal to about 20 on the Shore A scale, however, should not be considered limiting on the current disclosure.

A second contacting portion 320' of the sealing device 300' includes a contact edge 321', a lower surface 322', an upper surface 323', an inside surface 324', an outside surface 325', and a bore surface 326'. In various embodiments, each of the lower surface 322', the upper surface 323', the inside surface 324', and the outside surface 325' are flat in cross-section. In the current embodiment, the upper surface 323' is disclosed as having a stepped shape in cross-section, the upper surface 323' being made up of multiple flat portions, some of which are non-coplanar. The lower surface 312' is disclosed as having multiple portions as well, some of which are non-coplanar in cross-section. For example, the lower surface 312' is made up of at least one flat portion and at least one curved or bulbous portion including the contact edge 311'. The disclosure of each surface being either flat or stepped in cross-section, however, should not be considered limiting on the current disclosure. In various embodiments, any one or more of the lower surface 322', the upper surface 323', the inside surface 324', and the outside surface 325' are stepped, curved or otherwise of a shape that is not flat in cross-section. In various embodiments, each of the first contacting portion 310' and the second contacting portion 320' includes an annular rib as shown in each of the bulbous portions including the contact edges 311' and 321', respectively. In various embodiments, a material hardness of the second contacting portion 320' is greater than a material hardness of the first contacting portion 310'. In various embodiments, a material hardness of a second material forming the second contacting portion 320' measures within a range between 10 on the Shore A scale and 90 on the Shore A scale. In various embodiments, the material hardness of the second material forming the second contacting portion 320' measures within a range between about 20 on the Shore A scale and 90 on the Shore A scale. In various embodiments, the material hardness of the second material forming the second contacting portion 320' measures less than or equal to about 70 on the Shore A scale. In various embodiments, a material hardness of a material forming the second contacting portion 320' is less than or equal to about 85 on the Shore A scale. The disclosure of a material hardness of the second contacting portion 320' being less than or equal to about 70 or less than or equal to about 85 on the Shore A scale, however, should not be considered limiting on the current disclosure. In addition, the disclosure herein of specific hardness ranges should also not be considered limiting on the current disclosure.

In various embodiments of the sealing device 300' including the first contacting portion 310' and the second contacting portion 320', a first lowermost portion (i.e. the contact edge 311') of the first contacting portion 310' is positioned a first radial distance R1' from a central axis 650 (shown in FIG. 6) of the sealing device 300' and a second lowermost portion (i.e. the contact edge 321') of the second contacting portion 320' is positioned a second radial distance R2' from the central axis 650 of the sealing device 300', the first radial distance R1' greater than the second radial distance R2'. In various embodiments of the sealing device 300' further including the third contacting portion 330, a first lowermost portion (i.e. the contact surface 331) of the third contacting portion 330 is positioned a third radial distance R3' from the central axis 650 of the sealing device 300', the third radial distance R3' being less than the second radial distance R2'.

In various embodiments, the third radial distance R3' is measured to a point halfway between a radially inward edge of the contact surface 331 and a radially outward edge of the contact surface 331. In various embodiments, the contact surface 331 is effectively an edge because the distance between the radially inward edge of the contact surface 331 and the radially outward edge of the contact surface 331 is approximately zero. In various embodiments, one or both of the radially inward edge of the contact surface 331 and the radially outward edge of the contact surface 331 are radiused to create one or more smooth edges.

FIG. 8A discloses the air valve 100' in a slightly open position with the float 250 in close proximity to the sealing device 300' and the sealing device 300' shown assembled to a mounting surface 305 of the cover 120 with the fastener 301. In various embodiments, the radially innermost surface 334 of the third contacting portion 330 is flush and co-annular with the bore surface 231 of the bore 230 of the cover 120. A vertical distance measured between the contact edge 311' of the first contacting portion 310' and the upper surface 251 of the float 250 is defined as a first gap g1', where the "vertical" distance is measured in a direction parallel to the travel of the float 250 inside the enclosure 130 of the air valve 100'. A vertical distance measured between the contact edge 321' of the second contacting portion 320' and the upper surface 251 of the float 250 is defined as a second gap g2'. A vertical distance measured between the contact surface 331 of the third contacting portion 330 and the upper surface 251 of the float 250 is defined as a third gap g3'. In various embodiments, the first gap g1' measures less than the second gap g2', and the second gap g2' measures less than the third gap g3'.

Figure 8B:
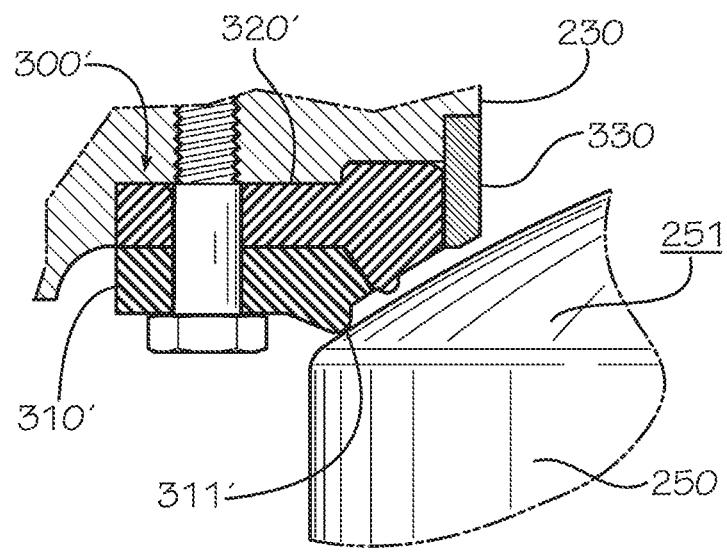
FIG. 8B is a sectional detail view of the float, sealing device, and cover of FIG. 6 with the float in initial contact with a first contacting portion of the sealing device, arranged in the view of detail 8 of FIG. 6.
Figure 8C:
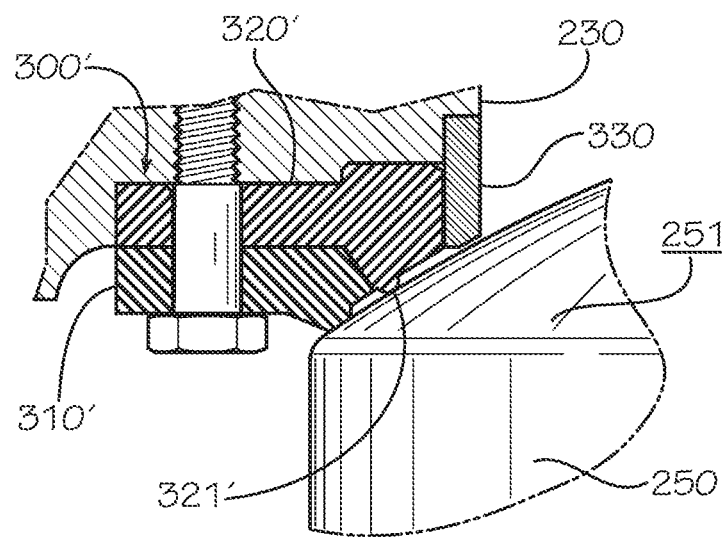
FIG. 8C is a sectional detail view of the float, sealing device, and cover of FIG. 6 with the float in initial contact with a second contacting portion of the sealing device, taken from detail 8 of FIG. 6.
Figure 8D:
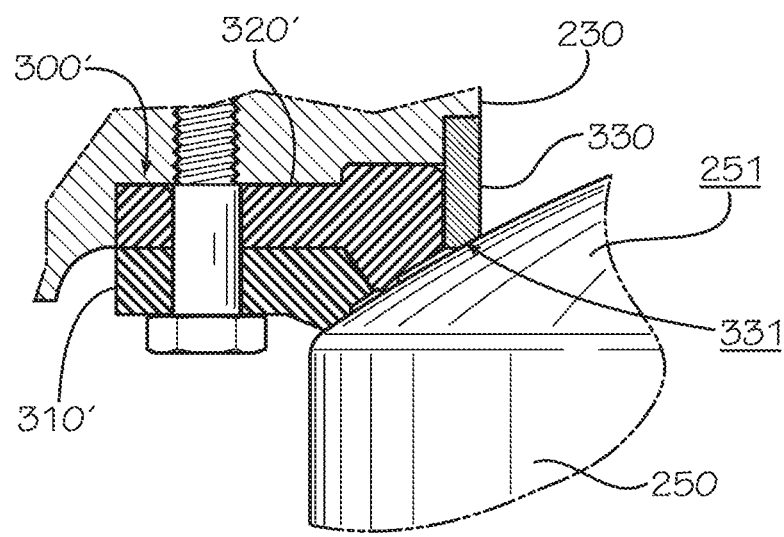
FIG. 8D is a sectional detail view of the float, sealing device, and cover of FIG. 6 with the float in initial contact with a third contacting portion of the sealing device, arranged in the view of detail 8 of FIG. 6.

FIGS. 8B through 8D show the interaction between the float 250 and the sealing device 300' of the air valve 100' as the pressure inside the fluid system 90 increases, causing the float 250 to increasingly compress the sealing device 300. FIGS. 8B through 8D disclose the float 250 in a first sealing position, a second sealing position, and a third sealing position, respectively. In FIG. 8B showing the float 250 engaging the sealing device 300' in the first sealing position, the upper surface 251 of the float 250 is in initial contact with the contact edge 311' of the first contacting portion 310' of the sealing device 300' but is not in contact with the second contacting portion 320' or the third contacting portion 330.

FIG. 8C discloses the float 250 engaging the sealing device 300' in the second sealing position with the upper surface 251 of the float 250 still in contact with the first contacting portion 310' but also shown in initial contact with the contact edge 321' of the second contacting portion 320' of the sealing device 300'. In various embodiments, the material forming the first contacting portion 310' is elastically deformed but not plastically deformed as the float 250 approaches the second sealing position from the first sealing position. If the material of the first contacting portion 310' is elastically deformed but not plastically deformed, the first contacting portion 310' is able to return to the shape it held before the float 250 came into contact with the sealing device 300' (as shown in FIG. 8A) and thus avoid the aforementioned "crush" form of seal damage. In the second sealing position, the float 250 is not yet in contact with the third contacting portion 330.

FIG. 8D discloses the float 250 engaging the sealing device 300' in the third sealing position, the upper surface 251 of the float 250 still in contact with the first contacting portion 310' and with the second contacting portion 320' but also shown in initial contact with the contact surface 331 of the third contacting portion 330 of the sealing device 300'. In various embodiments, the materials forming the first contacting portion 310' and the second contacting portion 320' are elastically deformed but not plastically deformed as the float 250 approaches the third sealing position from the second sealing position. If the material of the first contacting portion 310' and the second contacting portion 320' are elastically deformed but not plastically deformed, the first contacting portion 310' and the second contacting portion 320' are able to return to the shape each held before the float 250 came into contact with the sealing device 300' (as shown in FIG. 8A). In the third sealing position, further travel of the float 250 is avoided by using a relatively rigid material such as the aforementioned brass or stainless steel for the third contacting portion 330. Because further travel of the float 250 is avoided, the "crush" form of seal damage that can result from the sealing material experiencing "compression set" or otherwise experiencing permanent or plastic deformation is also avoided.

As discussed above with respect to the air valve 100 and air valves generally, a user may rightly be concerned as to whether a sealing device for an air valve is suitable for the relatively low, medium, or high pressures being experienced at the time an evaluation is made and installation is performed and also suitable to pressures that the air valve may experience in the future during operation. Installing an air valve such as the air valve 100' with the sealing device 300', which in various embodiments uses increasingly harder materials to form the first contacting portion 310', the second contacting portion 320', and the third contacting portion 330, respectively, alleviates this concern by making it possible to use the air valve 100' in a fluid system 90 having varying characteristics or even in varying fluid systems 90.

Figure 9:
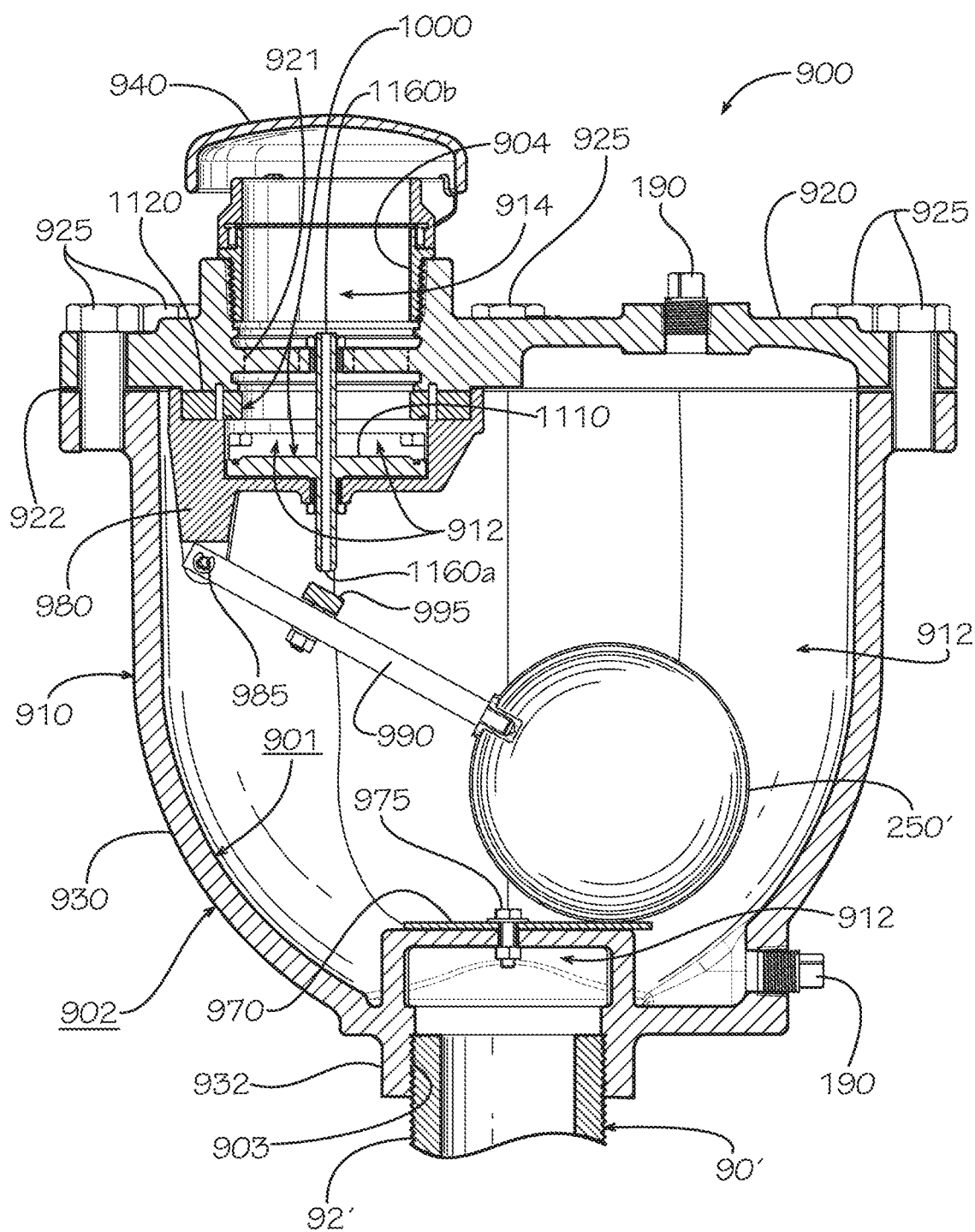
FIG. 9 is a sectional view of an air valve in accordance with another embodiment of the current disclosure.
Figure 10A:
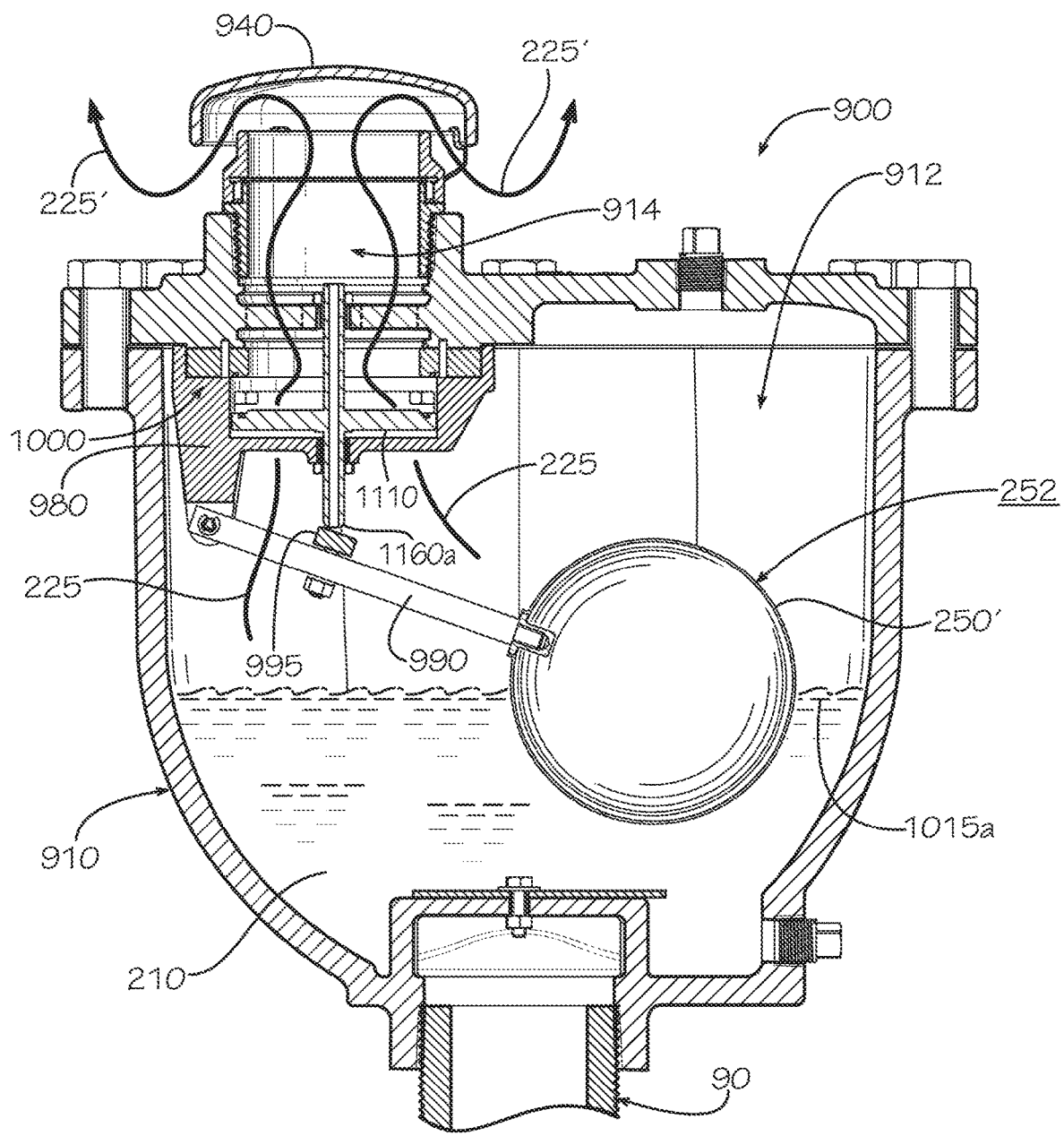
FIG. 10A is a sectional view of the air valve of FIG. 9 with a float of the air valve rising towards a closed position.
Figure 10B:
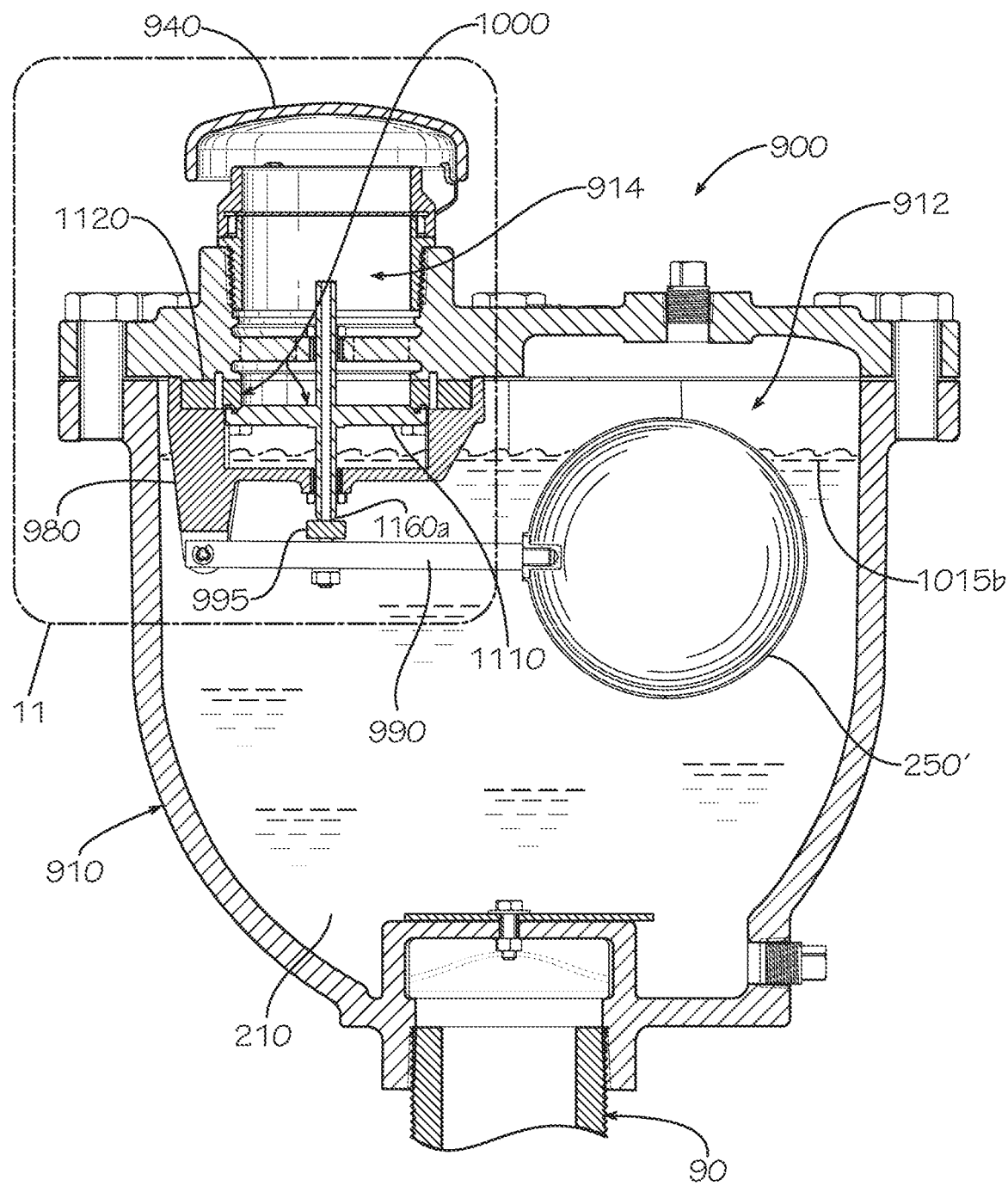
FIG. 10B is a sectional view of the air valve of FIG. 9 in the closed position.

FIG. 9 discloses an air valve 900 attached to the fluid system 90' containing a fluid 210 (shown in FIGS. 10A and 10B). In the current embodiment, the air valve 900 is a combination air valve. In various embodiments, the air valve 900 may be installed at high points and change of gradients inside a fluid system 90' or at regular intervals of, for example, approximately every one-quarter mile to one-half mile along sections of the fluid system 90' without clearly defined high points. However, the disclosure of such locations for the air valve 900 should not be considered limiting on the current disclosure, and the air valve 900 may be installed at any location in the fluid system 90' in various embodiments, including regular or irregular intervals. In the current embodiment, the air valve 900 is mounted on a high point of the fluid system 90' to allow air to travel upward by buoyancy in the fluid system 90' to the air valve 900, although the air valve 900 may be mounted at any point of the fluid system 90' where air may accumulate.

The air valve 900 includes a valve body 910 with a mounting portion 932 that attaches to a mounting portion 92' of the fluid system 90. In the current embodiment, mounting portions 92',932 are threaded male and female connections, respectively. The valve body 910 of the air valve 900 has an inner surface 901 and an outer surface 902 defining an inlet 903 and an outlet 904. The mounting portion 932 and the mounting portion 92' may connect to one another using any one or more of a number of different methods including, but not limited to, threads such as pipe threads, welding, or adhesive, or may be formed integrally as one part. In various embodiments, a mounting portion of the valve body 910 and a mounting portion of the fluid system 90 include mating flanges such as the mounting portion 132 of the valve body 110 and the mounting portion 92 of the fluid system 90. The valve body 910 includes an enclosure 930 and a cover 920 and may also include one or more plugs 190. The assembled air valve 900 may also include a seal 922 between the enclosure 930 and the cover 920. In various embodiments, the seal 922 is a gasket. The seal 922 may also be an O-ring. The cover 920 is assembled to the enclosure 930 with a plurality of fasteners 925 in the current embodiment. In various embodiments, fasteners 925 are hex head bolts. In various embodiments, the materials used to form or fabricate each of the components of the air valve 900 are the same as those used to form or fabricate the similar or corresponding components of the air valve 100,100'.

In various embodiments, the air valve 900 includes a ball-shaped float 250' and a sealing device 1000. In various embodiments, at least a portion of the sealing device 1000 is assembled to the cover 920 with a plurality of fasteners (not shown). In the current embodiment, the sealing device 1000 includes a poppet 1110 and a seat 1120. The poppet 1110, which can also be described as a valve device and is part of a group of valve devices including flap valves, swing valves, and the like that may not be characterized as a poppet and may not open and close with the same movement. In various embodiments, a valve may close against a sealing device by a rotational movement about a hinge point, the sealing device incorporating a plurality of contacting portions such as disclosed herein. The poppet 1110 defines a bottom end 1160a and a top end 1160b. When the float 250', moveable within the valve body 910 and removably coupled to the poppet 1110 via a lever arm 990 and a disc-shaped button 995 attached thereto, engages the sealing device 1000 to close the air valve 900, the air valve 900 effectively defines an inner chamber 912 and an outer chamber 914 that are separated from each other. In various embodiments, an inner chamber such as the inner chamber 912 of the air valve 900 can be described as a float chamber because it houses the float 250'. When the air valve 900 is open, fluid and air in the inner chamber 912 is able to enter the outer chamber 914 and vice versa. In various embodiments, the outer chamber 914 includes one or more cover outlets 921 defined in the cover 920 which provide passage for air from one portion of the outer chamber 914 to other portions of the outer chamber 914. In various embodiments, the air valve 900 includes a hood device—which can also be described as a cap or vent cap—which itself includes a hood 940. In various embodiments, the hood 940 also includes a screen (not shown) or a plurality of fasteners (not shown) for securing the hood device to the cover 120. Instead of the hood device being assembled to the cover 920 as shown in FIG. 9, the hood device may be assembled to another portion of the air valve 900 in various other embodiments.

In various embodiments, the float 250' is attached to the lever arm 990 to limit and direct the movement of the float 250 to a particular path—such as an arcuate path in the current embodiment. In various embodiments, the lever arm 990 is attached to a lever frame 980 using a pivot fastener 985 and includes the button 995. In various embodiments, the lever frame 980 is assembled to the cover 920 with a plurality of fasteners 981. In various embodiments, the float 250' engages the sealing device 1000 through the direction movement of the button 995. The button 995 is positioned on the lever arm 990 to contact the bottom end 1160a of the poppet 1110 when the float 250' moves vertically inside the air valve 900. In various embodiments, the button 995 moves the poppet 1110 away from or towards a closed position of the air valve 900 and allows or prevents air flow through the inside of the poppet 1110 itself, and the lever arm 990 limits the range of movement of the float 250' inside the air valve 900.

The air valve 900 may also include a cushion 970, held in position by a cushion retainer 975 in various embodiments, to cushion the float 250' when the float 250' nears or reaches its lowest vertical position. The float 250' is spherical in shape in the current embodiment but in various embodiments may have any one or more of a number of different shapes. Moreover, neither the disclosure of a spherical shape for the float 250' nor the location of the float 250' within the valve body 910 should be considered limiting. The float 250' in the current embodiment is formed from a rigid material but in various embodiments may be solid or hollow and may be formed from a flexible material, and if hollow may be pressurized with air or another fluid.

In various embodiments, it may be required that the float 250' become buoyant (i.e. float) in the fluid 210 of the fluid system 90' so as to effectuate the purpose of the float 250' responding to and effectively controlling the operation of the air valve 100,100'. In various embodiments, the float 250' is formed from stainless steel and is formed of two halves welded together to form a hollow interior that allows the float 250' to float in the fluid 210. In various embodiments, at least a portion of the outer surface 252 of the float 250' is polished to a mirror finish in order to reduce irregularities at the outer surface 252 where the float 250' contacts the fluid 210 in order to prevent the accumulation of any solid or liquid on the outer surface 252 of the float 250'. In various embodiments, the accumulation of any solid or liquid on the outer surface 252 of the float 250' increases the weight of the float 250' and either directly or indirectly affects the operation of the valve 900. In various other embodiments, a polished float 250 may not be needed or desired. In various embodiments, the float 250' is sealed in such a way that the float 250' is impermeable to fluid.

FIGS. 10A and 10B disclose the air valve 900 with the float 250' in two different positions. FIG. 10A discloses the air valve 900 with the float 250', buoyed by fluid 210 of fluid system 90, rising towards a closed position of the air valve 900. As a fluid level 1015a rises, the float 250' also rises—in an arcuate path in the current embodiment although in other embodiments the path taken by the float 250' may be linear. As the float 250' rises, the air escaping the air valve 900 travels from the inner chamber 912 through the outer chamber 914 before exiting the air valve 900 via airflow paths 225'. The float 250' is also shown engaging the poppet 1110 of the sealing device 1000 via the movement of the lever arm 990 and therefore also the button 995 contacting the bottom end 1160a of the poppet 1110. In various embodiments, the poppet 1110 is constrained to move in only a single, vertical direction by the vertical movement of the poppet 1110 within the lever frame 980 and the valve body 910.

FIG. 10B discloses the air valve 900 in the closed position with the float 250' at its highest vertical position. Also shown is the poppet 1110 and the seat 1120 of the sealing device 1000 in contact with each other as the result of the fluid 210 rising to a fluid level 1015b, buoying the float 250' at a higher position than with the fluid 210 at the fluid level 1015a. In the closed position of the air valve 900, a small amount of air is allowed to remain in the inner chamber 912, but the remaining air originally in the inner chamber 912 has entered the outer chamber 914 of the air valve 900 or exited the air valve 900 entirely. In the closed position of the air valve 900, the lever arm 990 is shown in an approximately horizontal position. In various other embodiments, however, the lever arm 990 may not be in an approximately horizontal position when the air valve 900 is in the closed position.

FIG. 11 discloses the air valve 900 in the closed position with the poppet 1110 in contact with the seat 1120. The poppet 1110 may include one or more guide shafts 955 to limit its movement in a particular path. In various embodiments, a lower guide shaft 955a of the poppet 1110 slides along an axial center of a lower bushing 960a and an upper guide shaft 955b slides along an axial center of an upper bushing 960b. In various embodiments, the poppet 1110 also defines a bore 1150 that runs from the bottom end 1160a to the top end 1160b. In various embodiments, the button 995 seals the end of the bore 1150 at the bottom end 1160a of the poppet 1110 when the air valve 900 is closed, isolating any air or fluid contained in the inner chamber 912 from the air or fluid in the outer chamber 914. As shown, the lever frame 980 in which the lower bushing 960a and the upper bushing 960b are assembled defines various hollow cavities to accommodate the bushings 960, the poppet 1110, and the movement of the air entering or exiting the air valve 900.

Figure 12:
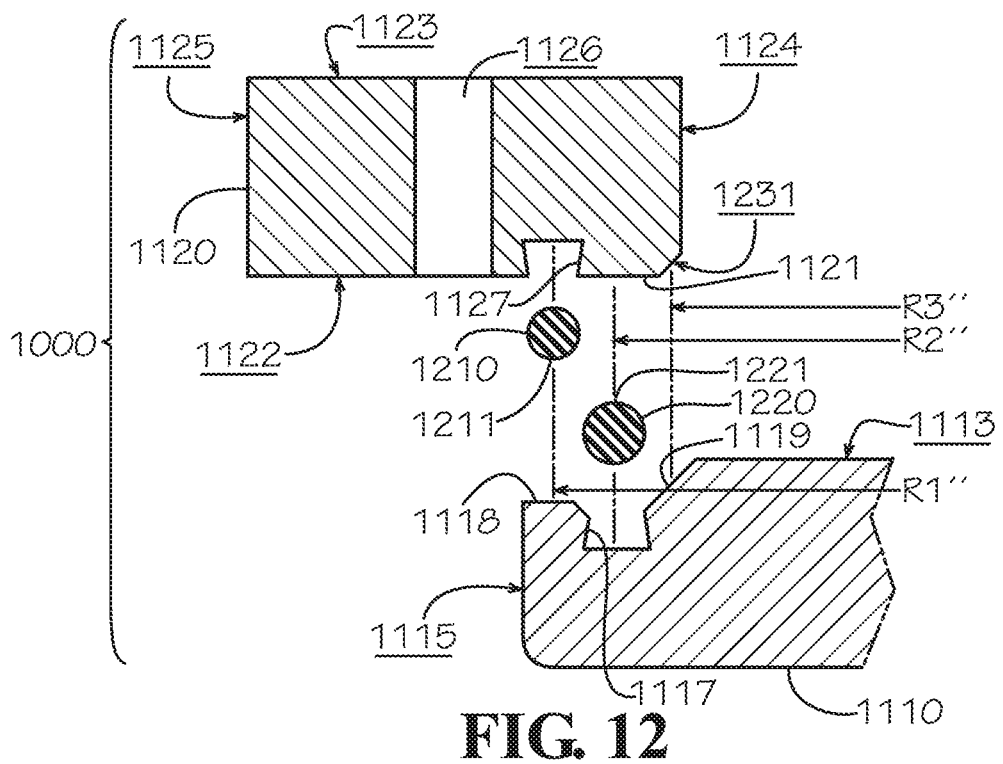
FIG. 12 is a sectional exploded view of the sealing device of FIG. 11.

FIG. 12 shows an exploded view of the sealing device 1000. In various embodiments, the sealing device 1000 includes the poppet 1110 and the seat 1120. In various embodiments, the poppet 1110 includes a top surface 1113 and an outer surface 1115 and a second contacting portion 1220. In various embodiments, the top surface 1113 includes a first mating portion 1118 and a third mating portion 1119 and defines a dovetail-shaped groove 1117 that is sized to accept and secure a second contacting portion 1220. The disclosure of a dovetail shape for the groove 1117 should not be considered limiting on the current disclosure, however, as a groove such as the groove 1117 may instead have a pair of side walls that are parallel to one another or that are vertical in orientation. In various embodiments, the groove 1117 is sized to allow the second contacting portion 1220 to flow or expand into the groove 1117 when the second contacting portion 1220 is compressed. In various embodiments, a dovetail shape for the groove 1117 provides an interference fit between the second contacting portion 1220 and the groove 1117 to help secure the second contacting portion 1220 inside the groove 1117. In various embodiments, the depth of the groove 1117 is greater than half the diameter or half the height of the second contacting portion 1220 in order to create an interference fit between the second contacting portion 1220 and the groove 1117 without deforming the second contacting portion 1220 except during the installation of the second contacting portion 1220. In various embodiments, the top surface 1113 of the poppet 1110 defines a groove such as the groove 1117 having a half-dovetail shape, where one side wall of the groove is vertical in orientation and another side wall of the groove is sloping. In various embodiments, an elastomeric sealing element such as the second contacting portion 1220 can be compression-molded to the poppet 1110—and partially within the groove 1117—to secure the second contacting portion 1220 to the poppet 1110.

In various embodiments, the seat 1120 includes a contact surface 1231, a lower surface 1122, an upper surface 1123, an inner surface 1124, an outer surface 1125, and a bore surface 1126. In various embodiments, the lower surface 1122 includes a second mating portion 1121 and further defines a dovetail-shaped groove 1127 that is sized to accept and secure a first contacting portion 1210. In various embodiments, the seat 1120 incorporates the first contacting portion 1210 in such a way that the first contacting portion 1210 is inseparable from the seat 1120. The disclosure of a dovetail shape for the groove 1127 should not be considered limiting on the current disclosure, however, as a groove such as the groove 1127 may instead have a pair of side walls that are parallel to one another or that are vertical in orientation. In various embodiments, the groove 1127 is sized to allow the first contacting portion 1210 to flow or expand into the groove 1127 when the first contacting portion 1210 is compressed. In various embodiments, a dovetail shape for the groove 1127 provides an interference fit between the first contacting portion 1210 and the groove 1127 to help secure the first contacting portion 1210 inside the groove 1127. In various embodiments, the depth of the groove 1127 is greater than half the diameter or half the height of the first contacting portion 1210 in order to create an interference fit between the first contacting portion 1210 and the groove 1127 without deforming the first contacting portion 1210 except during the installation of the first contacting portion 1210.

In various embodiments, at least a portion of one or more surfaces of the seat 1120 or the poppet 1110 is polished to a mirror finish in order to improve sealing between the seat 1120 or the poppet 1110. In various embodiments, a mirror polish at mating surfaces of the seat 1120 and the poppet 1110 improves sealing by reducing irregularities in surfaces that might otherwise prevent improved sealing.

The first contacting portion 1210 includes a contact edge 1211. In various embodiments, the first contacting portion 1210 is an O-ring with a circular cross-section. The disclosure of a circular cross-section for the first contacting portion 1210, however, should not be considered limiting on the current disclosure. In various embodiments, the first contacting portion 1210 of the air valve 900 is formed from one or more of a group of the same materials from which the first contacting portion 310 of the air valve 100 is formed. In various embodiments, a material hardness of a first material forming the first contacting portion 1210 measures within a range between 10 on the Shore A scale and 90 on the Shore A scale. In various embodiments, a material hardness of a first material forming the first contacting portion 1210 measures within a range between about 20 on the Shore A scale and 90 on the Shore A scale. In various embodiments, a material hardness of a first material forming the first contacting portion 1210 measures within a range between about 10 on the Shore A scale and about 40 on the Shore A scale. In various embodiments, a material hardness of a first material forming the first contacting portion 1210 is less than or equal to about 20 on the Shore A scale. The disclosure of a material hardness of the first contacting portion 1210 being less than or equal to about 20 on the Shore A scale, however, should not be considered limiting on the current disclosure.

The second contacting portion 1220 includes a contact edge 1221. In various embodiments, the second contacting portion 1220 is an O-ring with a circular cross-section. The disclosure of a circular cross-section for the second contacting portion 1220, however, should not be considered limiting on the current disclosure. In various embodiments, the second contacting portion 1220 is formed from one or more of a group of the same materials from which the second contacting portion 320 is formed. In various embodiments, a material hardness of the second contacting portion 1220 is greater than a material hardness of the first contacting portion 1210. In various embodiments, a material hardness of a second material forming the second contacting portion 1220 measures within a range between 10 on the Shore A scale and 90 on the Shore A scale. In various embodiments, the material hardness of the second material forming the second contacting portion 1220 measures within a range between about 20 on the Shore A scale and 90 on the Shore A scale. In various embodiments, the material hardness of the second material forming the second contacting portion 1220 measures less than or equal to about 70 on the Shore A scale. In various embodiments, a material hardness of a second material forming the second contacting portion 1220 is less than or equal to about 85 on the Shore A scale. The disclosure of a material hardness of the second contacting portion 1220 being less than or equal to about 70 or less than or equal to about 85 on the Shore A scale, however, should not be considered limiting on the current disclosure. In addition, the disclosure herein of specific hardness ranges should also not be considered limiting on the current disclosure.

In the valve 900, the seat 1120 functions as a third contacting portion of the sealing device 1000 in the current embodiment. In various embodiments, the contact surface 1231 is equivalent to the contact surface 331 of the third contacting portion 330 used in the air valve 100. The contact surface 1231 may be flat or may be slightly curved to complement the shape of the third mating portion 1119 of the top surface 1113 of the poppet 1110. In various embodiments, a material hardness of a material forming the third contacting portion—or the seat 1120 in the current embodiment—is greater than about 85 on the Shore A scale. The disclosure of a material hardness of the seat 1120 being greater than about 85 on the Shore A scale, however, should not be considered limiting on the current disclosure. In various embodiments, the seat 1120 is formed from a group of metals or metal alloys including, but not limited to, brass or stainless steel. In various embodiments, the seat 1120 is formed from brass, a material that is softer than stainless steel, in order to not mark or mar the top surface 1113 of the poppet 1110 during long-term operation of the air valve 900. The poppet 1110 in the current embodiment is formed from a rigid material.

In various embodiments of the sealing device 1000 including a first contacting portion 1210 and a second contacting portion 1220, a first lowermost portion (i.e. the contact edge 1211) of the first contacting portion 1210 is positioned a first radial distance R1" from a central axis 1250 of the sealing device 1000 and a second lowermost portion (i.e. the contact edge 1221) of the second contacting portion 1220 is positioned a second radial distance R2" from the central axis 1250 of the sealing device 1000, the first radial distance R1" greater than the second radial distance R2". In various embodiments of the sealing device 1000, the contact surface 1231, which can be described as a third contacting portion, is positioned a third radial distance R3" from the central axis 1250 of the sealing device 1000, the third radial distance R3" being less than the second radial distance R2". In various embodiments, the values of the first radial distance R1", the second radial distance R2", and the third radial distance R3" are less important when the surfaces against which the first contacting portion 1210, the second contacting portion 1220, and that portion of the seat 1120 functioning as a third contacting portion, respectively, contact are flat surfaces.

In various embodiments, the third radial distance R3" is measured to a point halfway between a radially inward edge of the contact surface 1231 and a radially outward edge of the contact surface 1231. In various embodiments, the contact surface 1231 is effectively an edge because the distance between the radially inward edge of the contact surface 1231 and the radially outward edge of the contact surface 1231 is approximately zero. In various embodiments, one or both of the radially inward edge of the contact surface 1231 and the radially outward edge of the contact surface 1231 are radiused to create one or more smooth edges.

Figure 13A:
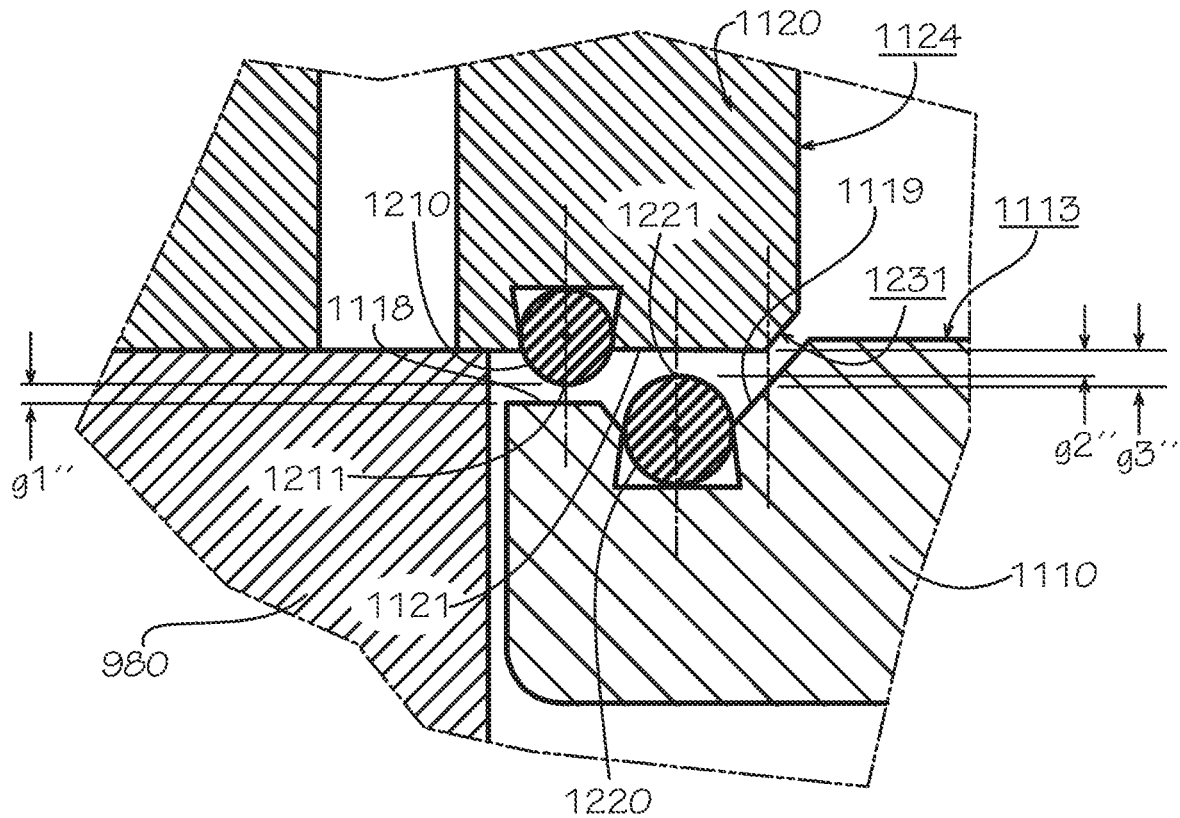
FIG. 13A is a sectional detail view of a sealing device of the air valve of FIG. 9 with the air valve in a slightly open position, arranged in the view of detail 13 of FIG. 11.

FIG. 13A discloses the air valve 900 in a slightly open position, the poppet 1110 in close proximity to the seat 1120 and inside the lever frame 980. In various embodiments, the radially innermost inner surface 1124 of the seat 1120 is flush and co-annular with a bore surface 1131 of a bore 1130 (shown in FIG. 11) of the cover 920. A vertical distance measured between the contact edge 1211 of the first contacting portion 1210 and the first mating portion 1118 of the top surface 1113 of the poppet 1110 is defined as a first gap g1", where the "vertical" distance is measured in a direction parallel to the travel of the poppet 1110 inside the air valve 900. A vertical distance measured between the contact edge 1221 of the second contacting portion 1220 and the second mating portion 1121 of the lower surface 1122 of the seat 1120 is defined as a second gap g2". A vertical distance measured between the contact surface 1231 of the seat 1120 and the third mating portion 1119 of the top surface 1113 of the poppet 1110 is defined as a third gap g3". In various embodiments, the first gap g1" measures less than the second gap g2", and the second gap g2" measures less than the third gap g3".

Figure 13B:
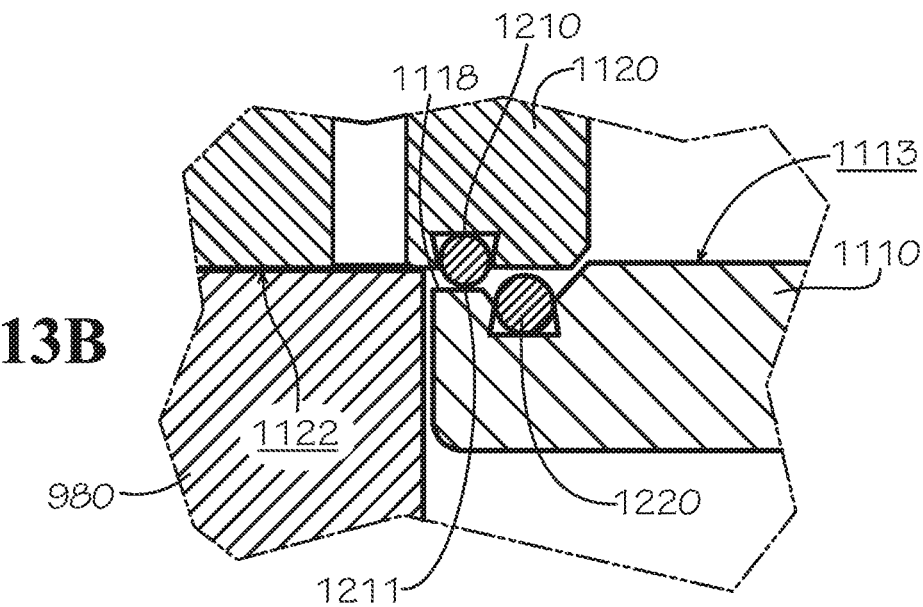
FIG. 13B is a sectional detail view of the sealing device of FIG. 11 with a poppet valve of the sealing device in initial contact with the first contacting portion of the sealing device, arranged in the view of detail 13 of FIG. 11.
Figure 13C:
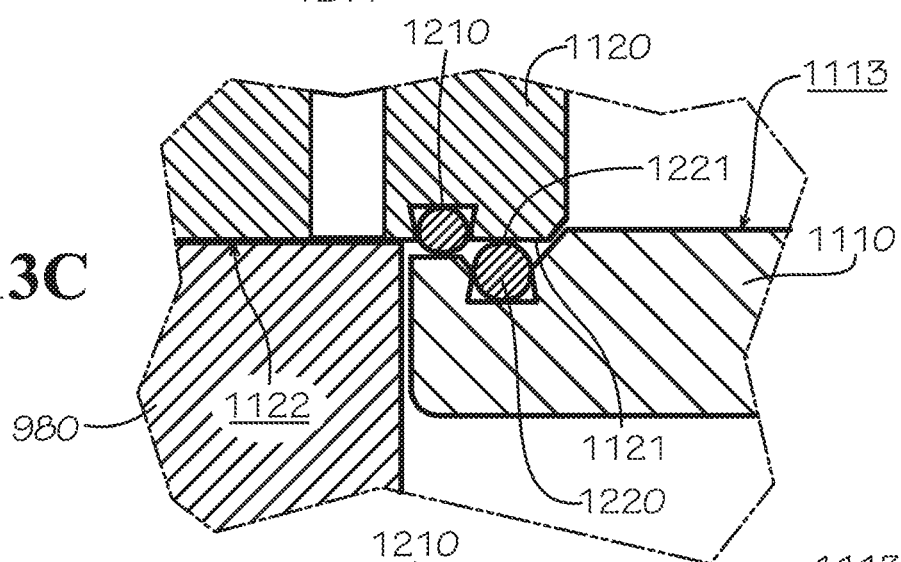
FIG. 13C is a sectional detail view of the sealing device of FIG. 11 with a seat of the sealing device in initial contact with the second contacting portion of the sealing device, arranged in the view of detail 13 of FIG. 11.
Figure 13D:
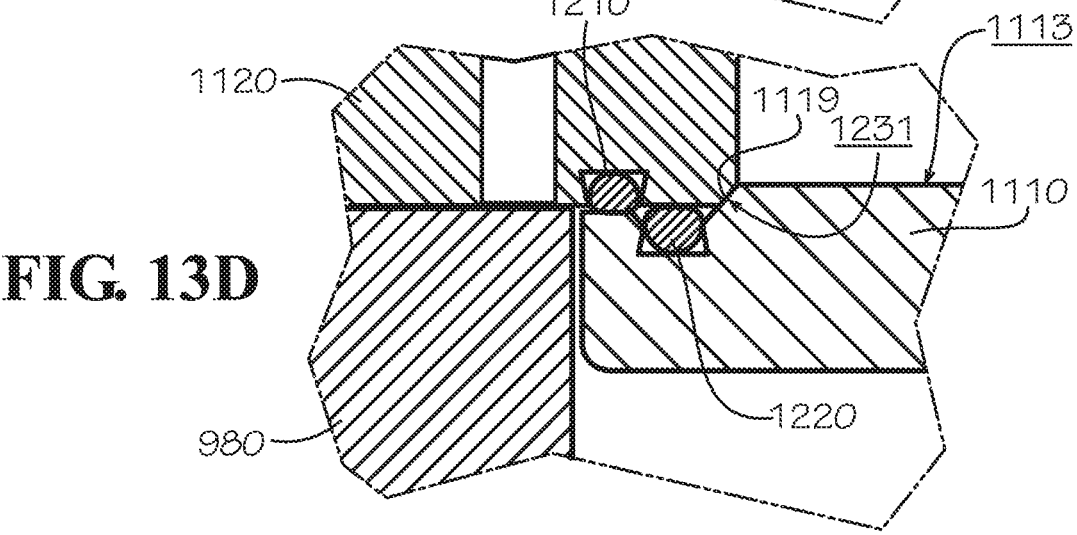
FIG. 13D is a sectional detail view of the sealing device of FIG. 11 with the poppet valve in initial contact with the third contacting portion of the sealing device, arranged in the view of detail 13 of FIG. 11.

FIGS. 13B through 13D show the interaction between the poppet 1110 and the seat 1120 as the pressure inside the fluid system 90' increases, causing the float 250' to rise and the poppet 1110 to increasingly compress the seat 1120. FIGS. 13B through 13D disclose the sealing device 1000 with the float 250' in a first sealing position, a second sealing position, and a third sealing position, respectively. In FIG. 13B showing the poppet 1110 engaging the seat 1120 with float 250' in the first sealing position, the first mating portion 1118 of the top surface 1113 of the poppet 1110 is in initial contact with the contact edge 1211 of the first contacting portion 1210. However, the second mating portion 1121 of the lower surface 1122 of the seat 1120 is not in contact with the second contacting portion 1220. In addition, the contact surface 1231 of the seat 1120 is not in contact with the third mating portion 1119 of the top surface 1113 of the poppet 1110.

FIG. 13C discloses the poppet 1110 engaging seat 1120 with the float 250' in the second sealing position, the first mating portion 1118 of the top surface 1113 of the poppet 1110 still in contact with the first contacting portion 1210. In addition, the second mating portion 1121 of the lower surface 1122 of the seat 1120 is in initial contact with the contact edge 1221 of the second contacting portion 1220. In various embodiments, the material forming the first contacting portion 1210 is elastically deformed but not plastically deformed as the float 250' approaches the second sealing position from the first sealing position—and as the poppet 1110 simultaneously rises to more fully engage the seal 1120. If the material of the first contacting portion 1210 is elastically deformed but not plastically deformed, the first contacting portion 1210 is able to return to the shape it held before the poppet 1110 came into contact with the seat 1120 (as shown in FIG. 13A) and thus avoid the aforementioned "crush" form of seal damage. In the second sealing position of the float 250', the third mating portion 1119 of the inner surface of the poppet 1110 is not yet in contact with the contact surface 1231 of the seat 1120.

FIG. 13D discloses the poppet 1110 engaging the seat 1120 with the float 250' in the third sealing position. The third mating portion 1119 of the top surface 1113 of the poppet 1110 is shown in initial contact with the contact surface 1231 of the seat 1120. In various embodiments, the materials forming the first contacting portion 1210 and the second contacting portion 1220 are elastically deformed but not plastically deformed as the float 250' approaches the third sealing position from the second sealing position—and as the poppet 1110 simultaneously rises to maximally engage the seal 1120. If the material of the first contacting portion 1210 and the second contacting portion 1220 are elastically deformed but not plastically deformed, the first contacting portion 1210 and the second contacting portion 1220 are able to return to the shape each held before the poppet 1110 came into contact with the seat 1120 (as shown in FIG. 13A). In the third sealing position of the float 250', further travel of the poppet 1110 is avoided by using a relatively rigid material such as the aforementioned brass or stainless steel for the seat 1120. Because further travel of the poppet 1110 is avoided, the "crush" form of seal damage that can result from the sealing material experiencing "compression set" or otherwise experiencing permanent or plastic deformation is also avoided.

Figure 14:
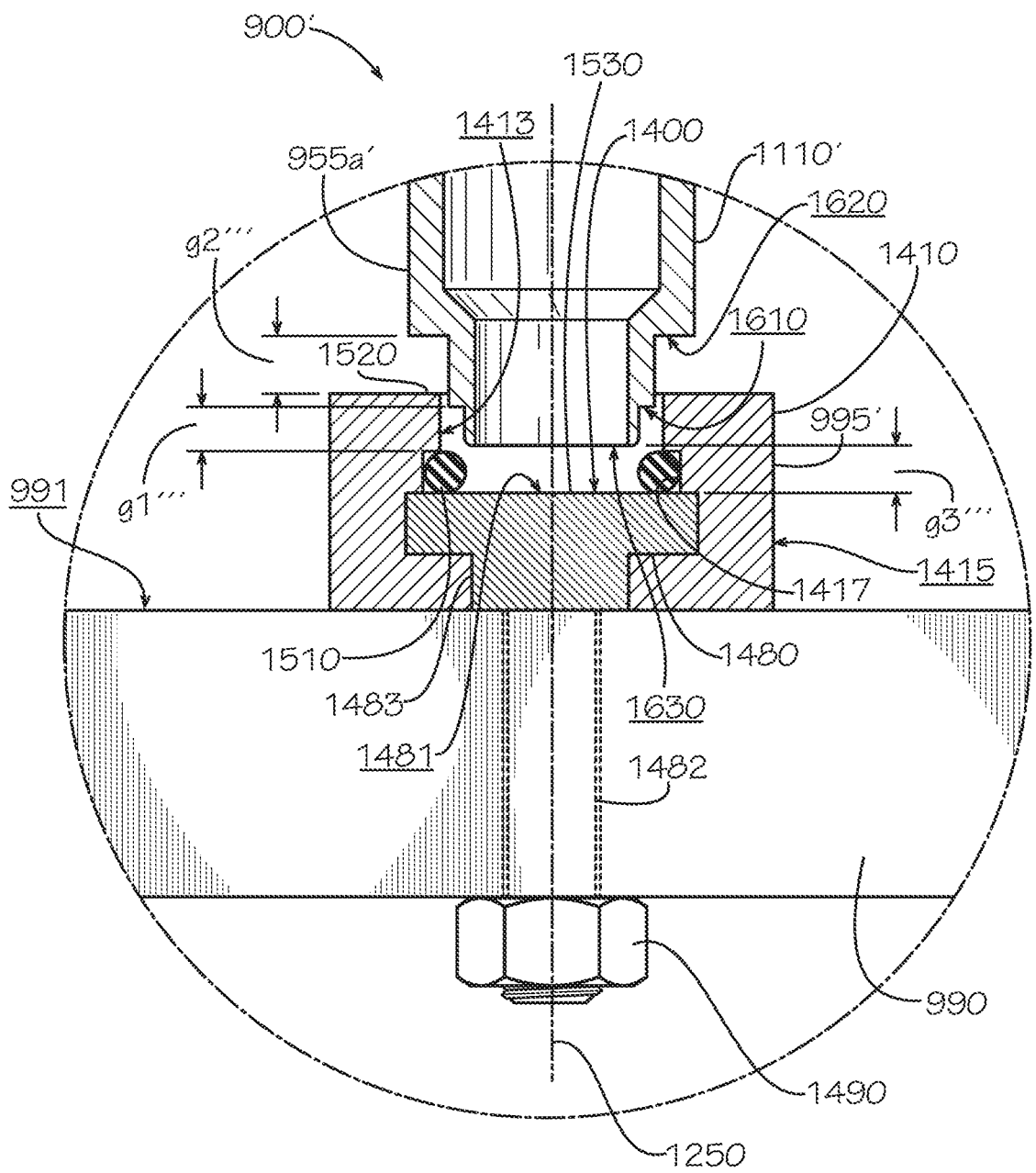
FIG. 14 is a partial section detail view of a sealing device in an air valve including a poppet valve and a button in proximity to one another, in accordance with another embodiment of the current disclosure and arranged in the view of detail 14 of FIG. 11.

FIG. 14 discloses a sealing device 1400 in an air valve such as the air valve 900 including a poppet 1110' and a disc-shaped button 995' in proximity to one another. In various embodiments, the sealing device 1400 includes the button 995'. In various embodiments, the button 995' includes a button surround 1410, a fastener 1480, and a nut 1490. In various embodiments, the button surround 1410 includes an inner surface 1413 and an outer surface 1415. In various embodiments, the inner surface 1413 defines an opening sized to accept the end of the poppet 1110' and defines a groove 1417 having a stepped shape. In various embodiments, the groove 1413 is sized to accept the head of the fastener 1480 and accept a first contacting portion 1510, which is an O-ring in the current embodiment. In various embodiments, the outer surface 1415 includes a second contacting portion 1520. In various embodiments, the fastener 1480 includes a shaft 1482, a shoulder 1483, and a third contacting portion 1530 defining a surface 1481. In various embodiments, the nut 1490 threadably receives the shaft 1482 of the fastener 1480, the nut 1490 and the shaft 1482 being threaded in various embodiments. In various embodiments, an outer diameter of the shoulder 1483 is larger than the shaft 1482 and large enough for the shoulder 1483 to act as a stop preventing movement of the shoulder 1483 past an upper surface 991 of the arm 990, thereby preventing over-compression of the button 995'.

In various embodiments, the poppet 1110' includes a first contact surface 1610, a second contact surface 1620, and a third contact surface 1630. Each of the first contact surface 1610, the second contact surface 1620, and the third contact surface 1630 are shown orthogonal to and concentric about the axis 1250. In various embodiments, the first contacting portion 1510 is an O-ring with a circular cross-section. The disclosure of a circular cross-section for the first contacting portion 1510, however, should not be considered limiting on the current disclosure. In various embodiments, the first contacting portion 1510 is formed from one or more of a group of the same materials from which the first contacting portion 310 is formed. In various embodiments, a material hardness of a first material forming the first contacting portion 1510 measures within a range between 10 on the Shore A scale and 90 on the Shore A scale. In various embodiments, a material hardness of a first material forming the first contacting portion 1510 measures within a range between about 20 on the Shore A scale and 90 on the Shore A scale. In various embodiments, a material hardness of a first material forming the first contacting portion 1510 measures within a range between about 10 on the Shore A scale and about 40 on the Shore A scale. In various embodiments, a material hardness of a first material forming the first contacting portion 1510 is less than or equal to about 20 on the Shore A scale. The disclosure of a material hardness of the first contacting portion 1510 being less than or equal to about 20 on the Shore A scale, however, should not be considered limiting on the current disclosure.

The second contacting portion 1520 of the button surround 1410 is shown orthogonal to and concentric about the axis 1250 when the arm 990 is perpendicular to the lower shaft 955a' of the poppet 1110'. In various embodiments, the second contacting portion 1520 is formed from one or more of a group of the same materials from which the second contacting portion 320 is formed. In various embodiments, a material hardness of the second contacting portion 1520 is greater than a material hardness of the first contacting portion 1510. In various embodiments, a material hardness of a second material forming the second contacting portion 1520 measures within a range between 10 on the Shore A scale and 90 on the Shore A scale. In various embodiments, the material hardness of the second material forming the second contacting portion 1520 measures within a range between about 20 on the Shore A scale and 90 on the Shore A scale. In various embodiments, the material hardness of the second material forming the second contacting portion 1520 measures less than or equal to about 70 on the Shore A scale. In various embodiments, a material hardness of a second material forming the second contacting portion 1520 is less than or equal to about 85 on the Shore A scale. The disclosure of a material hardness of the second contacting portion 1520 being less than or equal to about 70 or less than or equal to about 85 on the Shore A scale, however, should not be considered limiting on the current disclosure. In addition, the disclosure herein of specific hardness ranges should also not be considered limiting on the current disclosure.

In various embodiments, the surface 1481 defined on the fastener 1480 functions as a third contacting portion 1530 of the sealing device 1400. In various embodiments, an outer edge defined by each of the first contact surface 1610, the second contact surface 1620, or the third contact surface 1630 of a poppet such as the poppet 1110' may be partially or fully chamfered to complement the shape of a first contacting portion such as the first contacting portion 1510, a second contacting portion such as the second contacting portion 1520, and a third contacting portion such as the third contacting portion 1530, each with a matching chamfer or angled surface. In various embodiments, a material hardness of a material forming the third contacting portion—or the fastener 1480 in the current embodiment—is greater than about 85 on the Shore A scale. The disclosure of a material hardness of the fastener 1480 being greater than about 85 on the Shore A scale, however, should not be considered limiting on the current disclosure. In various embodiments, the fastener 1480 is formed from a group of metals or metal alloys including, but not limited to, brass or stainless steel. In various embodiments, the fastener 1480 is formed from brass, a material that is softer than stainless steel, in order to not mark or mar the poppet 1110' during long-term operation of an air valve such as the air valve 900. The poppet 1110' in the current embodiment is formed from a rigid material.

In FIG. 14, the air valve 900' is in a slightly open position, the poppet 1110' in close proximity to the button 995' and partially inside the button surround 1410. A vertical distance measured between an uppermost tangent edge of the first contacting portion 1510 and the first contact portion 1610 of the poppet 1110' is defined as a first gap $g1'''$, where the "vertical" distance is measured in a direction parallel to the travel of the poppet 1110' inside the air valve 900'. A vertical distance measured between the second contacting portion 1520 and the second contact portion 1620 of the poppet 1110' is defined as a second gap $g2'''$. A vertical distance measured between the third contacting portion 1530 and the third contact surface 1630 of the poppet 1110' is defined as a third gap $g3'''$. In various embodiments, the first gap $g1'''$ measures less than the second gap $g2'''$, and the second gap $g2'''$ measures less than the third gap $g3'''$. In various embodiments, the sealing device 1400 functions to seal the button 995' to the poppet 1110'.

As discussed above with respect to air valves 100,100' and air valves generally, a user may rightly be concerned as to whether a sealing device for an air valve is suitable for the relatively low, medium, or high pressures being experienced at the time an evaluation is made and installation is performed and also suitable to pressures that the air valve may experience in the future during operation. Installing an air valve such as the air valve 900 with the sealing device 1000, which in various embodiments uses increasingly harder materials to form the first contacting portion 1210, the second contacting portion 1220, and that portion of the seat 1120 functioning as a third contacting portion, respectively, alleviates this concern by making it possible to use the air valve 900 in a fluid system 90' having varying characteristics or even in varying fluid systems 90'.

Various methods exist for venting air from a fluid system 90' using the air valves described herein. In various embodiments of the air valves 100,100' or the air valve 900, venting air from a fluid system 90' includes installing an air valve or air valve apparatus such as the air valve 100; moving the float 250 to a first sealing position, the float 250 engaging the first contacting portion 310 but not the second contacting portion 320; moving the float 250 to a second sealing position engaging the first contacting portion 310 and the second contacting portion 320; and moving the float 250 to a third sealing position engaging the first contacting portion 310, the second contacting portion 320, and the third contacting portion 330. In various embodiments, a prior sealing device (i.e. a sealing device previously installed in the air valve 100) may be replaced or retrofitted with the sealing device 300 prior to moving the float to a first sealing position.

In various embodiments, the air valves 100,100' define a nominal outlet diameter of eight inches as measured at the outlet 104. In various embodiments, the air valve 900 defines a nominal outlet diameter of between one inch and four inches as measured at the outlet 904. The disclosure of nominal outlet diameters of between one and eight inches, however, should not be considered limiting on the current disclosure. In various embodiments, the nominal outlet diameter of an air valve as described herein could be less than one inch or could be as much as twenty inches or more. In various embodiments, an air valve such as either of the air valves 100,100' is a full-flow valve through which the cross-sectional space for fluid flow is constant throughout from the inlet to the outlet. In various embodiments, an air valve is a restricted-flow valve through which flow is restricted from the inlet to the outlet. The disclosure of full-flow or restricted-flow air valves should not be considered limiting on the current disclosure, however, as a sealing device such as those disclosed herein can be adapted for use with either a full-flow or a restricted-flow air valve.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

In addition, the size, shape, thickness, and other dimensions and features of the various components shown in the figures are for illustrative purposes and should not be considered limiting on the current disclosure. The drawings are not drawn to scale.

That which is claimed is:

1. An air valve comprising:
    a valve body having an inner surface and an outer surface, the inner surface and the outer surface defining an inlet and an outlet;
    a sealing device mounted within the valve body, the sealing device including a first contacting portion and a second contacting portion, one of the first contacting portion and the second contacting portion of the sealing device defining a lower surface; and
    a float moveable within the valve body, the float having a first sealing position and a second sealing position, the lower surface of the one of the first contacting portion and the second contacting portion of the sealing device facing an upper surface of the float, a portion of the lower surface in contact with the float and flat in cross-section also angled with respect to a central axis of the sealing device by a non-90-degree angle.

2. The air valve of claim 1, wherein a one of the first contacting portion and the second contacting portion includes an annular rib.

3. The air valve of claim 2, wherein the annular rib is on the first contacting portion.

4. The air valve of claim 3, wherein the annular rib on the first contacting portion is a first annular rib, and the second contacting portion includes a second annular rib.

5. The air valve of claim 2, wherein the first contacting portion includes a lower surface, the lower surface comprising a cross-sectionally flat lower portion and the annular rib adjacent to and radially inward from the flat lower portion.

6. The air valve of claim 5, wherein the lower surface further comprises a cross-sectionally flat radially inward portion adjacent to the annular rib, the flat radially inward portion non-coplanar with the flat lower portion.

7. The air valve of claim 2, wherein the float engages the first contacting portion but not the second contacting portion when the float is in the first sealing position, and wherein the float engages both the first contacting portion and the second contacting portion when the float is in the second sealing position.

8. The air valve of claim 2, wherein a material hardness of the second contacting portion is greater than a material hardness of the first contacting portion.

9. The air valve of claim 2, wherein the sealing device further includes a third contacting portion, the float further having a third sealing position, the float engaging the third contacting portion when the float is in the third sealing position.

10. The air valve of claim 9, wherein a material hardness of the third contacting portion is greater than a material hardness of the first contacting portion and greater than a material hardness of the second contacting portion.

11. The air valve of claim 9, wherein:
    the third contacting portion of the sealing device includes a land;
    the float contacts the land in the third sealing position; and
    a surface of the land contacting the float in the third sealing position has a cross-sectional shape that is complementary to a cross-sectional shape of an upper surface of the float.

12. The air valve of claim 9, wherein the first contacting portion and the second contacting portion are deformed elastically but not deformed plastically when the float is in the third sealing position.

13. The air valve of claim 2, wherein a first vertical gap is defined between a first point of contact on the first contacting portion and a first point of contact on the float and a second vertical gap is defined between a first point of contact on the second contacting portion and a second point of contact on the float, the first vertical gap less than the second vertical gap.

14. The air valve of claim 2, wherein the float engages a valve device in at least one of the first sealing position and the second sealing position, the valve device contacting the first contacting portion but not the second contacting portion when the float is in the first sealing position, and the valve device contacting both the first contacting portion and the second contacting portion when the float is in the second sealing position.

15. The air valve of claim 2, wherein a first material forming the first contacting portion has a material hardness of less than or equal to about 20 on the Shore A scale and a second material forming the second contacting portion has a material hardness of less than or equal to about 70 on the Shore A scale.

16. The air valve of claim 2, wherein a first material forming the first contacting portion has a material hardness within a range between about 10 and about 40 on the Shore A scale; and wherein a second material forming the second contacting portion has a material hardness within a range between about 20 and about 90 on the Shore A scale.

17. The air valve of claim 2, wherein the annular rib comprises a curved bulbous portion.

18. A method for venting air from a fluid system, the method comprising:
    installing an air valve apparatus on the fluid system, the air valve apparatus including a valve body defining an inlet and an outlet, a sealing device mounted inside the valve body, and a float moveable within the valve body, the sealing device including a first contacting portion, a second contacting portion, and a third contacting portion;

moving the float to a first sealing position engaging the first contacting portion but not the second contacting portion or the third contacting portion;

moving the float to a second sealing position engaging the first contacting portion and the second contacting portion but not the third contacting portion; and moving the float to a third sealing position engaging the first contacting portion, the second contacting portion, and the third contacting portion, a gap remaining between an upper surface of the float and at least a portion of one of the first contacting portion and the second contacting portion.

19. The method of claim 18, wherein a one of the first contacting portion and the second contacting portion includes an annular rib.

20. The method of claim 19, further comprising replacing a prior sealing device with the sealing device prior to moving the float to a first sealing position.

21. An air valve comprising:

a valve body having an inner surface and an outer surface, the inner surface and the outer surface defining an inlet and an outlet;

a sealing device mounted within the valve body, the sealing device including a first contacting portion and a second contacting portion; and a float moveable within the valve body and defining an upper surface, the float having a first sealing position and a second sealing position, one of the first contacting portion and the second contacting portion of the sealing device defining a lower surface parallel to the upper surface of the float.

* * * * *